US010755342B1

(12) United States Patent
Karthikeyan et al.

(10) Patent No.: US 10,755,342 B1
(45) Date of Patent: Aug. 25, 2020

(54) MULTISOURCE AUGMENTED REALITY MODEL

(71) Applicant: ACCENTURE GLOBAL SOLUTIONS LIMITED, Dublin (IE)

(72) Inventors: Sailatha Karthikeyan, Bangalore (IN); Marin Grace Mercylawrence, Bangalore (IN); Prasanna Srinivasa Rao, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 16/410,890

(22) Filed: May 13, 2019

(51) Int. Cl.
*G06Q 30/06* (2012.01)
*G06F 16/9535* (2019.01)
*G06N 5/04* (2006.01)
*G06N 20/00* (2019.01)

(52) U.S. Cl.
CPC ..... *G06Q 30/0643* (2013.01); *G06F 16/9535* (2019.01); *G06N 5/043* (2013.01); *G06N 20/00* (2019.01); *G06Q 30/0633* (2013.01)

(58) Field of Classification Search
CPC .......... G06Q 30/6043; G06Q 30/0633; G06Q 30/0261; G06Q 30/0643; G06Q 30/0631; G06Q 30/0641; G06Q 30/0256; G06Q 10/0838; G06Q 30/0601; G06Q 30/0255; G06Q 30/0259; G06Q 30/00; G06N 20/00; G06N 5/043; G06F 16/9535; G06F 3/0481; G06F 16/248; G06F 16/24575; G06F 16/26; G06F 16/287; G06F 16/338; G06F 2221/2111; G06T 19/006; G06T 2215/16; G06T 17/05; G06T 2200/24; G06T 7/60; Y10S 707/99933; Y10S 707/99935; G06K 9/00671; H04N 21/2542; H04N 21/478; H04N 21/47815
See application file for complete search history.

(56) References Cited

U.S. PATENT DOCUMENTS 9,965,793 B1 * 5/2018 Hasan .................... G06F 16/951
2014/0285522 A1 * 9/2014 Kim .................... G06Q 30/0601
345/633

* cited by examiner

*Primary Examiner* — Haixia Du
(74) *Attorney, Agent, or Firm* — Mannava & Kang, P.C.

(57) ABSTRACT

Examples of a multisource augmented reality model are defined. In an example, the system receives a query from a user. The system obtains representative data corresponding to an environment associated with the query and identifies at least one context therein. The system obtains product parameter data and identifies a parameter set therein to process the query. The system implements an artificial intelligence component to sort the product parameter data, the representative data, and the context for identifying pertinent data domains associated with the query. The system may establish a product augmented reality model corresponding to the product by performing a first cognitive learning operation on a domain from the updated pertinent data domains and the identified parameter set. The system may a list of related products for guided selling facilitating a shopping decision of the user. The system may generate an augmented reality result for the user.

20 Claims, 17 Drawing Sheets

MULTISOURCE AUGMENTED REALITY MODEL

BACKGROUND

The importance of Augmented Reality (AR) based enriching techniques is on the rise. AR-based techniques have emerged as a new channel to attract, engage, and retain customers who prefer to augment reality during their shopping experience. In the retain world, historically, individual stores may create their own AR application to promote single store products and catalogs. Such applications may be used to augment any of the products available in those individual stores over an AR compatible device for facilitating a customer's decision-making process. However, such applications only consider items that may be available at a selected store. Such applications often do not consider items that may be available at a different store.

Currently, there is no system available to a user when the user wants to augment items from more than one store and ascertain the compatibility of those items. Also, there is no system that allows stores to create promotional activities in collaboration with different stores and apply various user filters to products such as price, color, brand and the like.

Applications that may augment items onto an AR compatible medium may provide an enhanced platform for facilitating sales for any e-commerce platform however ignoring products from other e-commerce platforms may constrain the efficiency of the augmentation process. Furthermore, single source item augmentation may be not be optimized in the world of "always on" where the market landscape, technology disruption, and demand situation constantly evolve.

There is therefore a need for a system that may augment products from various stores and may perform a compatibility analysis for items augmented from various platforms. There is also a requirement for a system which helps customer and e-commerce stores to collaborate and create an end to end augmented user journeys using multiple store catalogs, multiple stores and recommend the items, promotions and the like based on the augmented data insights along with customers' previous store data insights.

Accordingly, a technical problem with the currently available procurement processes is that they may be inefficient, inaccurate, and/or not scalable. There is a need for a real time intelligence augmentation model which will consider the right set of criteria, and perform a compatibility analysis amongst various items across multiple e-commerce stores. Additionally, there is a need for a system that may facilitate multiple store collaborations, sales package generation, and the like based on the continuous sensing of emerging risks and opportunities, the evaluation of recommendations, and the rapid action/engagement opportunities of completing a sales process.

DETAILED DESCRIPTION

Figure 1:
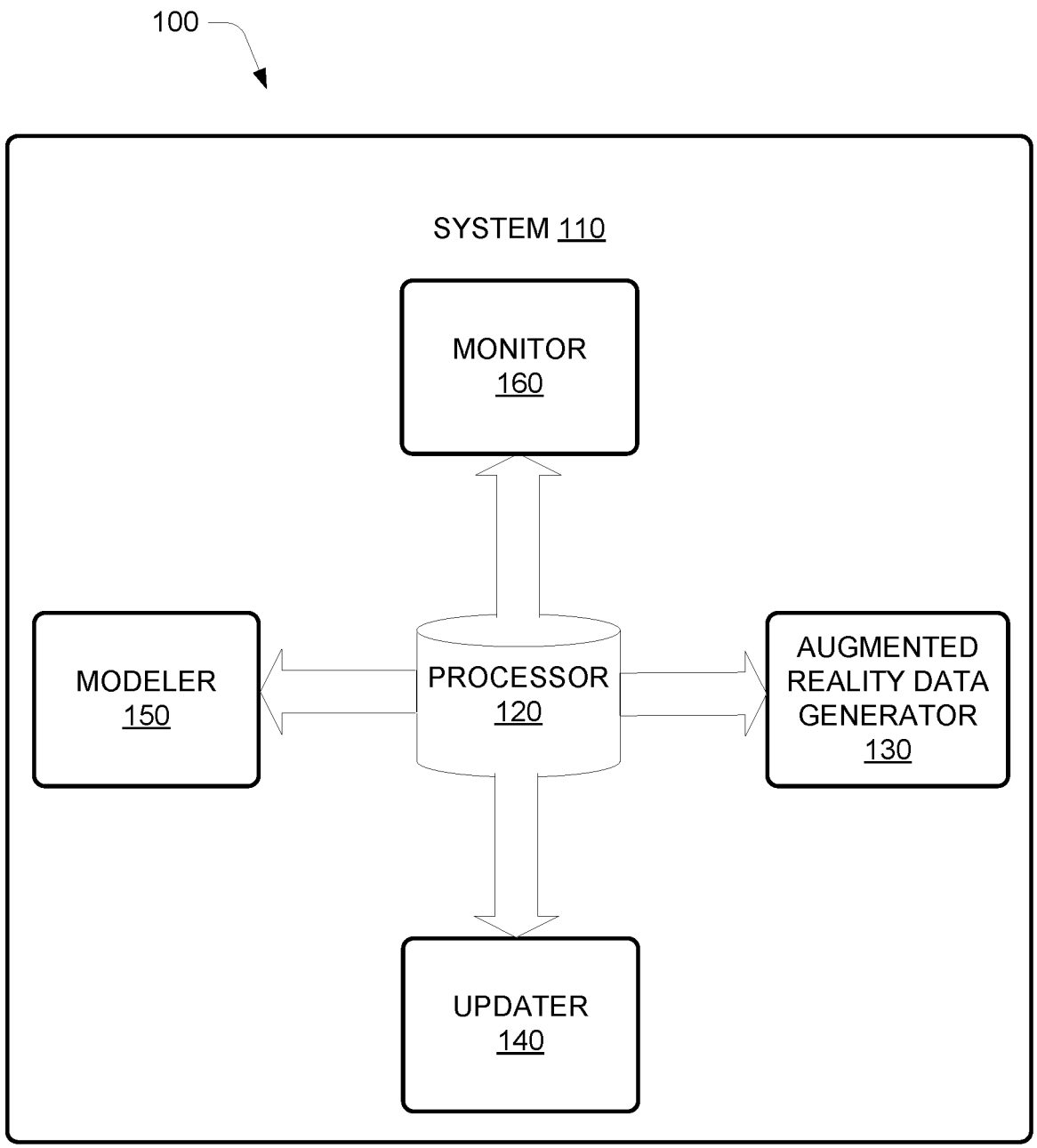
FIG. 1 illustrates a diagram for a system for a multisource augmented reality model, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to.

The present disclosure describes a system and method for a multisource augmented reality model (MARM). The multisource augmented reality model system (referred to as "system") may be used to augment various products onto an augmented reality (referred to as "AR" hereinafter) compatible medium for facilitating a sales process from a supplier end or a procurement process from a user end. For the sake of brevity and technical clarity, all embodiments of the system described hereunder have been exemplified to facilitate the procurement process from a user perspective. However, it should be understood that the system may be applied from a supplier end for facilitating the sales process. For example, the system may be used to help customer and e-commerce stores to collaborate and create an end to end augmented user journey using multiple store catalogs, multiple stores and recommend the items, and develop promotions and the like based on the augmented data insights. Further, the system may be used for creating promotions by collaborating data from a previous customer experience with different stores and augmented data insights. The system may also be used for checking the compatibility of products from different stores based on user filter criteria. Additionally, the system may also perform dynamic context model building based on the user selection of products and user criteria.

The system may include a processor, an augmented reality data generator, an updater, a modeler, and a monitor. The processor may be coupled to the augmented reality data generator, the updater, the modeler and the monitor. The augmented reality data generator may be configured to obtain a query from a user. The query may indicate a personalization requirement based on augmented reality operations relevant for a procurement order for a product. The augmented reality data generator may determine at least one context from representative data relevant for the procurement order for the product. The representative data may correspond to an environment associated with the query. The augmented reality data generator may obtain product parameter data from a plurality of data sources associated with the query and identify a parameter set from the product parameter data to process the query. The parameter set may be related to the product. The augmented reality data generator may implement an artificial intelligence component to sort the product parameter data, the representative data, and the context determined from the representative data into a plurality of data domains. The augmented reality data generator may evaluate each domain from the plurality of data domains to identify data domains pertinent to the product associated with the query. In an example, the augmented reality data generator is to further establish an augmented reality data library, by associating the data domains pertinent to the product with the product augmented reality model and the peripheral augmented reality model. The system may further analyze the augmented reality data library for validation of the product augmented reality model and the peripheral augmented reality model.

In accordance with various embodiments of the present disclosure, the updater may determine whether the data domains pertinent to the product may be updated based on a modification in the plurality of data domains. The updater may update the data domains pertinent to the product based on the modification in the plurality of data domains. In an example, the updater is to further electronically notify the user when there is a change in the data domains pertinent to the product due to the modification in the plurality of data domains.

In accordance with various embodiments of the present disclosure, the modeler may obtain the updated data domains pertinent to the product identified from the plurality of data domains. The modeler may further obtain the identified parameter set and the representative data associated with the query. The modeler may establish a product augmented reality model corresponding to the product by performing a first cognitive learning operation on a domain from the updated data domains pertinent to the product and the identified parameter set.

In accordance with various embodiments of the present disclosure, the monitor may obtain the identified parameter set related to the product and determine a peripheral product parameter set from the identified parameter set. The peripheral product parameter set may complement the parameter set related to the product. The monitor may implement a second cognitive learning operation to establish a peripheral augmented reality model corresponding to the peripheral product parameter set. The monitor may further generate an augmented reality result for the user associated with the product augmented reality model and the peripheral augmented reality model relevant for a resolution to the query. In an example, the augmented reality result may be generated as an interactive augmented reality interface in response to the query of the user. In an example, the monitor is to further provide evidence supporting the peripheral augmented reality model. In an example, the monitor may further update the peripheral product parameter set and the associated peripheral augmented reality model based on a modification in the product augmented reality model.

The embodiments for the multisource augmented reality model presented herein are exemplary in nature and should be treated as such. For the sake of brevity and technical clarity, the description of the multisource augmented reality model model may be restricted to few exemplary embodiments, however, to a person skilled in the art it should be clear that the multisource augmented reality model (system) may be used for fulfillment of various augmented reality insight generation-based requirements other than those mentioned hereinafter.

Accordingly, the present disclosure aims to provide real intelligence augmentation model which will consider the right set of criteria, and perform a compatibility analysis amongst various items across multiple e-commerce stores. Additionally, reactive synthesis of procurement intelligence, which may also be considering the impact of multiple factors and compatibility analysis based on the request of a user may be required by current retail paradigm. Further, the model may facilitate multiple store collaborations, sales package generation, and the like based continuous sensing of emerging risks and opportunities, the evaluation of recommendations, and the rapid action/engagement opportunities of completing a sales process. The system may also be used for guided procurement of products. For example, the system may propose a product for a user based on user selection of a previous product.

The present disclosure provides for efficient and continuous analysis of data required for various procurement processes operations, which in turn provides for continuous, efficient and accurate analysis of the procurement requirements of a user. The system may be configured to support human decision making for processing a procurement requirement.

Furthermore, the system may then analyze various categories of procurement data, based on the various parameters to accurately interpret the transactional documents. Because the system may capture all relevant elements (processes and/or features) of a problem and the subsequent analysis of the problem may be performed based on augmented reality models corresponding to the elements, the analysis may be substantially free from errors.

FIG. 1 illustrates a system for multisource augmented reality model 110 (referred to as system 110 hereinafter), according to an example implementation of the present disclosure. In an example, the system 110 may include a processor 120. The processor 120 may be coupled to an augmented reality data generator 130, an updater 140, a modeler 150, and a monitor 160.

The augmented reality data generator 130 may be configured to obtain a query from a user. The query may indicate a personalization requirement based on augmented reality operations relevant for a procurement order for a product. For example, the query may be to procure various goods and services from an e-commerce platform. In an example, the query may indicate procurement of various goods and services across various e-commerce platforms. The augmented reality data generator 130 may be configured to obtain representative data from an environment associated with the user. The environment may be a space arrangement pertaining to the personalization requirement. In an example, the environment may be an area where the user might be situated while using the system. In an example, the environment may be related to a space wherein the product associated with the personalization requirement would be placed after procurement. For example, the environment may be a room for which the user may wish to purchase furniture. The augmented reality data generator 130 may obtain data representative of the environment. The representative data may correspond to the environment associated with the query. In an example, the augmented reality data generator 130 may obtain the representative data directly onto an AR compatible medium associated with the system 110. In an example, the user may upload the representative data onto the AR compatible medium. In an example, the representative data may include data pertaining to goods related to the product associated with the personalization requirement. The augmented reality data generator 130 may determine at least one context from representative data relevant for the procurement order for the product. For example, the user may wish to purchase a table as part of the furniture for a room that has been obtained by the system 110 as part of the environment associated with the personalization requirement. The augmented reality data generator 130 may determine the table purchase as one of the context from the representative data. In an example, the context may include determining the factors associated with the purchase of the table like table dimensions, table materials, materials associated with other products already present in the environment. In an example, the context may include identifying goods that may be compatible with the product associated with the personalization requirement.

The augmented reality data generator 130 may obtain product parameter data from a plurality of data sources associated with the query and identify a parameter set from the product parameter data to process the query. In an example, the parameter data further comprise researching various factors like features of a product or service, benefits of a product or service, cost of a product or service, availability of a product or service, location of a product or service, delivery method of a product or service, information regarding updates in a product or service, innovation assessment for a product or service, risk assessment for a product or service, technology assessment for a product or service, an existing collaboration for a product or service and the like. In an example, the parameter data may be a set of historical data stored in the system 110, which may be accessed by the system 110 for processing the personalization requirement. In accordance with an embodiment of the present disclosure, the plurality of data sources may include various databases maintained by various e-commerce stores. The parameter set may be related to the product.

The parameter set may include a measurable factor, which may be forming one of a set that may define a condition for processing the personalization requirement. In an example, the parameter set may include multiple measurable factors that would have an impact on the purpose of the personalization requirement. For example, the purpose of the query may be to purchase furniture, for example, a table for a room. The augmented reality data generator 130 may search through the plurality of data sources and identify measurable factors, which may have an impact on the procurement of furniture. For example, the augmented reality data generator 130 may identify different types of tables available across various e-commerce stores, which may be compatible with the representative data identified for the environment. The augmented reality data generator 130 may access the historical data stored in the system 110 for identifying various categories, which may be used for classification of various types of tables as per user requirement. The augmented reality data generator 130 may identify an uptick in the popularity of a certain type of product like a table, a brand for tables, a material used for manufacturing tables, a design, product dimensions and the like. The augmented reality data generator 130 may research different e-commerce providers for furniture, which may help the user in generating a comparison between various options available. Further, the augmented reality data generator 130 may identify other measurable factors (not mentioned herein), which may be relevant for the processing the personalization requirement like procuring furniture for a room or any other requirement (explained further in detail with more exemplary embodiments by way of subsequent Figs.).

The augmented reality data generator 130 may implement an artificial intelligence component to sort the product parameter data, the representative data, and the context determined from the representative data into a plurality of data domains. The artificial intelligence component may be one of a data extractor, a data classifier, a data associator, a data comparer, a relationship extractor, and a dependency parser and the like. In an example, the parameter set may be identified through application of a set of category intelligence operations on at least one domain from the plurality of data domains. The category intelligence operations may include identification of all measurable factors associated with the purpose of the personalization requirement (further explained by way of subsequent Figs.). In an example, the system 110 may identify a new parameter set for processing each personalization requirement. In an example, the parameter set identified for a personalization requirement may include at least one set that has been pre-set by a user.

The augmented reality data generator 130 may evaluate each domain from the plurality of data domains to identify data domains pertinent to the product associated with the query. The data domains pertinent to the product may be data domains from the plurality of data domains, which might have a greater prevalence over other domains from the plurality of data domains for processing the personalization requirement. In an example, the data domains pertinent to the product may be domains which may be classified by the augmented reality data generator 130 as being most important for processing the personalization requirement. As mentioned above, the system 110 may analyze a variety of factors critical to a product, and may also analyze related data for processing the personalization requirement. Accordingly, the system 110 may identify at least one domain from the plurality of data domains as being data domains pertinent to the product associated with the personalization requirement (explained in detail by way of subsequent Figs. along with exemplary embodiments). In an example, the data domains pertinent to the product may be data for a product associated with the personalization requirement. In an example, data domains pertinent to the product may be those pertaining to financial considerations while processing the personalization requirements. In an example, the system 110 may identify a new set of the pertinent data domains for processing each personalization requirement. In an example, the pertinent data domains may be identified for a personalization requirement may include at least one domain that has been pre-set by a user.

In accordance with various embodiments of the present disclosure, the updater may determine whether the data domains pertinent to the product may be updated based on a modification in the plurality of data domains. The updater may update the data domains pertinent to the product based on the modification in the plurality of data domains. In an example, the modification in the plurality of data domains may be due to a fluctuation in a data-set from any of the plurality of data domains. In an example, the modification in the identified parameter set may be due to fluctuation in any of the data domains pertinent to the product. The updater 140 may update the data domains pertinent to the product based on the modification in the plurality of data domains and the modification in the identified parameter set. For example, one of the parameter data received may pertain to product availability data for a particular e-commerce store. There may be an update regarding inventory issues or price fluctuations for that product for that particular e-commerce store. Such an update would be acquired by the augmented reality data generator 130 and the data domains pertinent to the product, and the identified parameter set would be updated to include the possibility of the non-availability of the product or price changes for the product. In another example, there may be an update in information on a strategic parameter associated with a personalization requirement, for example, a multi-store collaboration related to the product associated with the query and a related product. Such an update would be acquired by the augmented reality data generator 130 and the data domains pertinent to the product, and the identified parameter set would be updated accordingly (explained further by way of subsequent FIGS. 1n an example, updater is to further electronically notify the user when there is a change in the data domains pertinent to the product due to the modification in the plurality of data domains. As mentioned above, in some cases the updates in the parameter data received from the plurality of sources may have a critical impact on the processing of the personalization requirement. In some cases, the data domains pertinent to the product may require an update based on new information available through the product parameter data. The system 110 may be configured to notify the user whenever an update available for the product parameter data being monitored for processing the personalization requirement leads to a change in the data domains pertinent to the product. In an example, the system 110 may require permission from the user for updating the data domains pertinent to the product based on new information available through the product parameter data.

In accordance with various embodiments of the present disclosure, the modeler 150 may obtain the updated data domains pertinent to the product identified from the plurality of data domains. The modeler 150 may further obtain the identified parameter set and the representative data associated with the query. The modeler 150 may establish a product augmented reality model corresponding to the product by performing a first cognitive learning operation on a domain from the updated data domains pertinent to the product and the identified parameter set (explained in detail by way of subsequent Figs.). The modeler 150 may update the product augmented reality model corresponding to the update in the updated data domains pertinent to the product. For example, one of the parameter data received may pertain to sales data for a particular product. There may be an update of an inventory issue for a particular e-commerce store for that product. Such an update would be acquired by the augmented reality data generator 130 and the data domains pertinent to the product, and the identified parameter set would be updated to include the possibility of the product non-availability. The product augmented reality model generated thus far may need to be updated to incorporate the impact of the possibility of non-availability of the product as well. The system 110 may be configured to update the product augmented reality model whenever there may be an update in the data domains pertinent to the product.

In accordance with various embodiments of the present disclosure, the monitor 160 may obtain the identified parameter set related to the product and determine a peripheral product parameter set from the identified parameter set. The peripheral product parameter set may complement the parameter set related to the product. The monitor 160 may implement a second cognitive learning operation to establish a peripheral augmented reality model corresponding to the peripheral product parameter set. The monitor 160 may further generate an augmented reality result for the user associated with the product augmented reality model and the peripheral augmented reality model relevant for a resolution to the query. In an example, the augmented reality result may be generated as an interactive augmented reality interface in response to the query of the user. In an example, the monitor 160 is to further provide evidence supporting the peripheral augmented reality model. In an example, the monitor 160 may further update the peripheral product parameter set and the associated peripheral augmented reality model based on a modification in the product augmented reality model.

In an example, the augmented reality data generator 130 is to further establish an augmented reality data library, by associating the data domains pertinent to the product with the product augmented reality model and the peripheral augmented reality model. The system may further analyze the augmented reality data library for validation of the product augmented reality model and the peripheral augmented reality model. For example, the system 110 may identify a parameter set for a particular personalization requirement. Additionally, the system would also identify a set of data domains pertinent to the product for that particular personalization requirement. The augmented reality data generator 130 may be configured to associate the identified parameter set and the identified data domains pertinent to the product for that specific personalization requirement. The system 110 may store the identified parameter set with the associated data domains pertinent to the product in the augmented reality data library. The system 110 may access the augmented reality data library for using the identified parameter set with the associated data domains pertinent to the product for processing a similar personalization requirement in future (further explained by way of subsequent Figs.).

Figure 2:
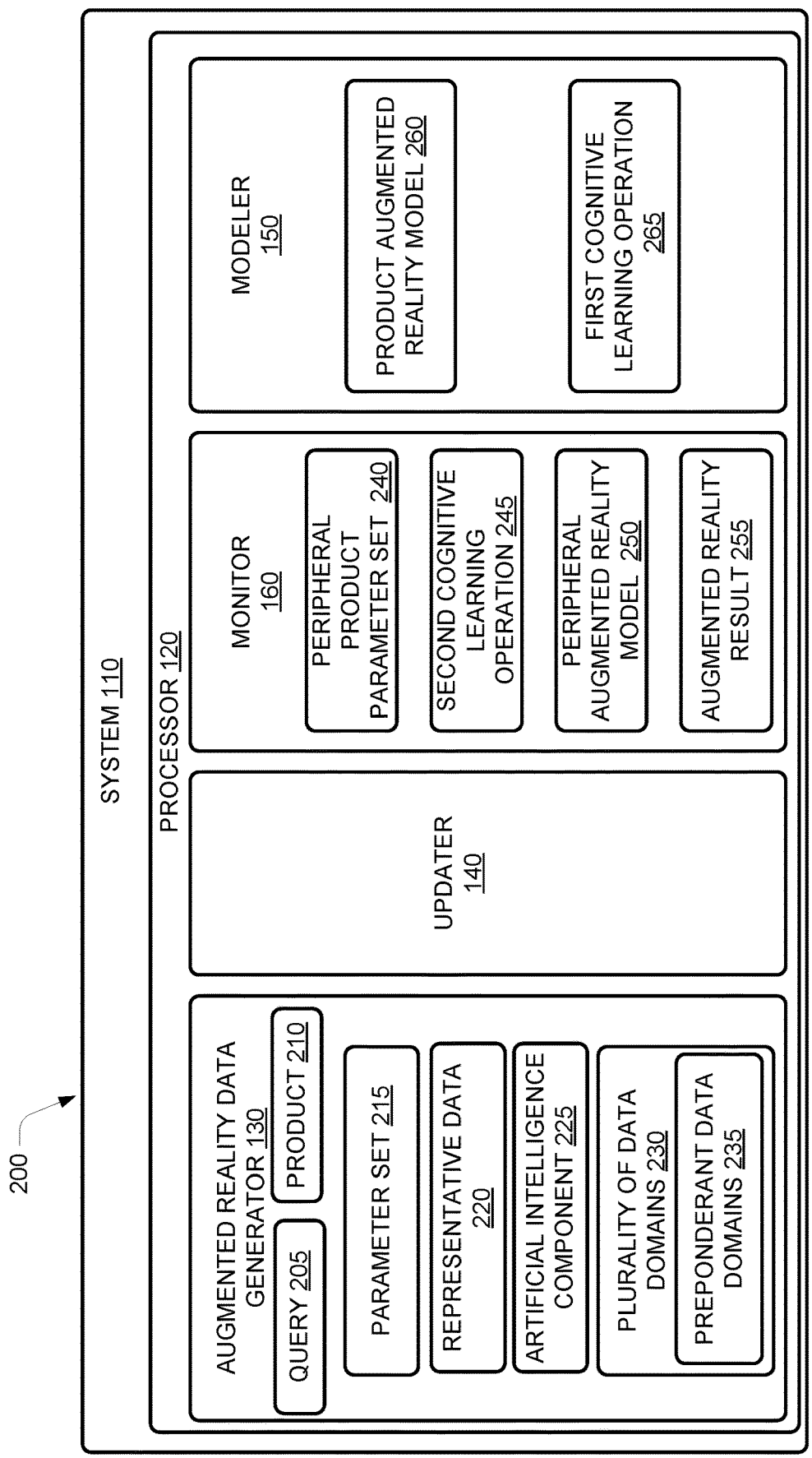
FIG. 2 illustrates various components of a system for a multisource augmented reality model, according to an example embodiment of the present disclosure.

FIG. 2 illustrates various components of the system 110 for a multisource augmented reality model, according to an example embodiment of the present disclosure.

In accordance with an example of the present disclosure, the system 110 described herein may include the processor 120. The processor 120 may be coupled to the augmented reality data generator 130, the updater 140, the modeler 150, and the monitor 160.

The augmented reality data generator 130 may be configured to obtain a query 205 from a user. The query 205 may indicate a personalization requirement (also referred to as "personalization requirements") based on augmented reality operations relevant for a procurement order for a product 210. For example, the query 205 may be to procure various goods and services from an e-commerce platform. In an example, the query 205 may indicate procurement of various goods and services across various e-commerce platforms. The embodiments for the personalization requirements presented herein are exemplary in nature and should be treated as such. For the sake of brevity and technical clarity, the description of the personalization requirements may be restricted to few exemplary embodiments, however, to a person skilled in the art it should be clear that the multisource augmented reality model (system 110) may be used for the fulfillment of various personalization requirements other than those mentioned hereinafter.

The augmented reality data generator 130 may be configured to obtain representative data 220 from an environment associated with the user. The environment may be a space arrangement pertaining to the personalization requirement. In an example, the environment may be an area where the user might be situated while using the system. In an example, the environment may be related to space wherein the product 210 associated with the personalization requirement would be placed after procurement. For example, the environment may be a room for which the user may wish to purchase furniture. The augmented reality data generator 130 may obtain data representative of the environment. The representative data 220 may correspond to the environment associated with the query 205. In an example, the augmented reality data generator 130 may obtain the representative data 220 directly onto an AR compatible medium associated with the system 110. In an example, the user may upload the representative data 220 onto the AR compatible medium. In an example, the representative data 220 may include data pertaining to goods related to the product 210 associated with the personalization requirement. The augmented reality data generator 130 may determine at least one context from representative data 220 relevant for the procurement order for the product 210. For example, the user may wish to purchase a table as part of the furniture for a room that has been obtained by the system 110 as part of the environment associated with the personalization requirement. The augmented reality data generator 130 may determine the table purchase as one of the context from the representative data 220. In an example, the context may include determining the factors associated with the purchase of the table like table dimensions, table materials, materials associated with other product 210s already present in the environment. In an example, the context may include identifying goods that may be compatible with the product 210 associated with the personalization requirement.

The augmented reality data generator 130 may obtain product parameter data from a plurality of data sources associated with the query 205 and identify a parameter set 215 from the product parameter data to process the query 205. In an example, the parameter data further comprise researching various factors associated with the product 210 like features of the product 210 or service, benefits of the product 210 or service, cost of the product 210 or service, availability of the product 210 or service, location of the product 210 or service, delivery method of the product 210 or service, information regarding updates in the product 210 or service, innovation assessment for the product 210 or service, risk assessment for the product 210 or service, technology assessment for the product 210 or service, an existing collaboration for the product 210 or service and the like. In an example, the parameter data may be a set of historical data stored in the system 110, which may be accessed by the system 110 for processing the personalization requirement. In accordance with an embodiment of the present disclosure, the plurality of data sources may include various databases maintained by various e-commerce stores.

The parameter set 215 may be related to the product 210. The parameter set 215 may include a measurable factor, which may be forming one of a set that may define a condition for processing the personalization requirement. In an example, the parameter set 215 may include multiple measurable factors that would have an impact on the purpose of the personalization requirement. For example, the purpose of the query 205 may be to purchase furniture, for example, a table for a room. The augmented reality data generator 130 may search through the plurality of data sources and identify measurable factors, which may have an impact on the procurement of furniture. For example, the augmented reality data generator 130 may identify different types of tables available across various e-commerce stores, which may be compatible with the representative data 220 identified for the environment. The augmented reality data generator 130 may access the historical data stored in the system 110 for identifying various categories, which may be used for classification of various types of tables as per user requirement. The augmented reality data generator 130 may identify an uptick in the popularity of a certain type of product 210 like a table, a brand for tables, a material used for manufacturing tables, a design, product 210 dimensions and the like. The augmented reality data generator 130 may research different e-commerce providers for furniture, which may help the user in generating a comparison between various options available. Further, the augmented reality data generator 130 may identify other measurable factors (not mentioned herein), which may be relevant for the processing the personalization requirement like procuring furniture for a room or any other requirement (explained further in detail with more exemplary embodiments by way of subsequent Figs.).

The augmented reality data generator 130 may implement an artificial intelligence component 225 to sort the product parameter data, the representative data 220, and the context determined from the representative data 220 into a plurality of data domains 230. The artificial intelligence component 225 may be one of a data extractor, a data classifier, a data associator, a data comparer, a relationship extractor, and a dependency parser and the like. In an example, the parameter set 215 may be identified through application of a set of category intelligence operations on at least one domain from the plurality of data domains 230. The category intelligence operations may include identification of all measurable factors associated with the purpose of the personalization requirement (further explained by way of subsequent Figs.). In an example, the system 110 may identify a new parameter set 215 for processing each personalization requirement. In an example, the parameter set 215 identified for a personalization requirement may include at least one set that has been pre-set by a user.

The augmented reality data generator 130 may evaluate each domain from the plurality of data domains 230 to identify data domains pertinent to the product 210 associated with the query 205 (also referred to as "pertinent data domains 235" hereinafter). The pertinent data domains 235 may be data domains from the plurality of data domains 230, which might have a greater prevalence over other domains from the plurality of data domains 230 for processing the personalization requirement. In an example, the pertinent data domains 235 may be domains which may be classified by the augmented reality data generator 130 as being most important for processing the personalization requirement. As mentioned above, the system 110 may analyze a variety of factors critical to a product 210, and may also analyze related data for processing the personalization requirement. Accordingly, the system 110 may identify at least one domain from the plurality of data domains 230 as being pertinent data domains 235 associated with the personalization requirement (explained in detail by way of subsequent Figs. along with exemplary embodiments). In an example, the pertinent data domains 235 may be data for a product 210 associated with the personalization requirement. In an example, pertinent data domains 235 may be those pertaining to financial considerations while processing the personalization requirements. In an example, the system 110 may identify a new set of the pertinent data domains for processing each personalization requirement. In an example, the pertinent data domains may be identified for a personalization requirement may include at least one domain that has been pre-set by a user.

In accordance with various embodiments of the present disclosure, the updater 140 may determine whether the pertinent data domains 235 may be updated based on a modification in the plurality of data domains 230. The updater 140 may update the pertinent data domains 235 based on the modification in the plurality of data domains 230. In an example, the modification in the plurality of data domains 230 may be due to a fluctuation in a data-set from any of the plurality of data domains 230. In an example, the modification in the identified parameter set 215 may be due to fluctuation in any of the data domains pertinent to the product 210. The updater 140 may update the pertinent data domains 235 based on the modification in the plurality of data domains 230 and the modification in the identified parameter set 215. For example, one of the parameter data received may pertain to product 210 availability data for a particular e-commerce store. There may be an update regarding inventory issues or price fluctuations for that product 210 for that particular e-commerce store. Such an update would be acquired by the augmented reality data generator 130 and the data domains pertinent to the product 210, and the identified parameter set 215 would be updated to include the possibility of the non-availability of the product 210 or price changes for the product 210. In another example, there may be an update in information on a strategic parameter associated with a personalization requirement, for example, a multi-store collaboration related to the product 210 associated with the query 205 and a related product 210. Such an update would be acquired by the augmented reality data generator 130 and the data domains pertinent to the product 210, and the identified parameter set 215 would be updated accordingly (explained further by way of subsequent FIGS. 1n an example, updater 140 is to further electronically notify the user when there is a change in the pertinent data domains 235 due to the modification in the plurality of data domains 230. As mentioned above, in some cases the updates in the parameter data received from the plurality of sources may have a critical impact on the processing of the personalization requirement. In some cases, the pertinent data domains 235 may require an update based on new information available through the product parameter data. The system 110 may be configured to notify the user whenever an update available for the product parameter data being monitored for processing the personalization requirement leads to a change in the data domains pertinent to the product 210. In an example, the system 110 may require permission from the user for updating the pertinent data domains 235 based on new information available through the product parameter data.

In accordance with various embodiments of the present disclosure, the modeler 150 may obtain the updated pertinent data domains 235 identified from the plurality of data domains 230. The modeler 150 may further obtain the identified parameter set 215 and the representative data 220 associated with the query 205. The modeler 150 may establish a product augmented reality model 260 corresponding to the product 210 by performing a first cognitive learning operation 265 on a domain from the updated pertinent data domains 235 and the identified parameter set 215 (explained in detail by way of subsequent Figs.). The modeler 150 may update the product augmented reality model 260 corresponding to the update in the updated pertinent data domains 235. For example, one of the parameter data received may pertain to sales data for a particular product 210. There may be an update of an inventory issue for a particular e-commerce store for that product 210. Such an update would be acquired by the augmented reality data generator 130 and the data domains pertinent to the product 210, and the identified parameter set 215 would be updated to include the possibility of the product 210 non-availability. The product augmented reality model 260 generated thus far may need to be updated to incorporate the impact of the possibility of non-availability of the product 210 as well. The system 110 may be configured to update the product augmented reality model 260 whenever there may be an update in the data domains pertinent to the product 210.

In accordance to various embodiments of the present disclosure, the monitor 160 may obtain the identified parameter set 215 related to the product 210 and determine a peripheral product parameter set 240 from the identified parameter set 215. The peripheral product parameter set 240 may complement the parameter set 215 related to the product 210. For example, a user may wish to purchase a table for a room using the system 110 through e-commerce stores. The monitor 160 may identify that the table may need, for example, a few chairs to complete the set. Further, the monitor 160 may identify that the table might need, for example, a flower vase or a table cloth to complete the set. The monitor 160 may determine features of the products identified as related to the product 210 and determine the peripheral product parameter set 240. In an example, the peripheral product parameter set 240 may include features, availability, compatibility, brand information for all related products.

The monitor 160 may implement a second cognitive learning operation 245 to establish a peripheral augmented reality model 250 corresponding to the peripheral product parameter set 240. In an example, the second cognitive learning operation 245 may include determining the compatibility of the products identified as related to the product 210 with the product 210 associated with the query 205. For example, the second cognitive learning operation 245 may determine if a chair identified as related to the table that may be an exemplary product 210 complements each other in terms of brand, color, dimensions and the like. The peripheral augmented reality model 250 may include augmenting the products identified as related to the product 210 onto the AR compatible medium along with the product augmented reality model 260. In an example, second cognitive learning operation 245 may determine a set of chairs as being compatible to a table, which has been identified as a preferred choice by a user for the fulfillment of the query 205. The second cognitive learning operation 245 may augment the set of chairs identified onto the AR compatible medium along with the table, which would be augmented onto the AR compatible medium as part of the product augmented reality model 260 (explained further by way of subsequent Figs.).

The monitor 160 may further generate an augmented reality result 255 for the user associated with the product augmented reality model 260 and the peripheral augmented reality model relevant for a resolution to the query 205. In an example, the augmented reality result may be generated as an interactive augmented reality interface in response to the query 205 of the user. In an example, the monitor 160 is to further provide evidence supporting the peripheral augmented reality model. In an example, the monitor 160 may further update the peripheral product parameter set 240 and the associated peripheral augmented reality model based on a modification in the product augmented reality model 260.

In an example, the augmented reality data generator 130 is to further establish an augmented reality data library, by associating the pertinent data domains 235 with the product augmented reality model 260 and the peripheral augmented reality model. The system may further analyze the augmented reality data library for validation of the product augmented reality model 260 and the peripheral augmented reality model. For example, the system 110 may identify a parameter set 215 for a particular personalization requirement. Additionally, the system would also identify a set of pertinent data domains 235 for that particular personalization requirement. The augmented reality data generator 130 may be configured to associate the identified parameter set 215 and the identified pertinent data domains 235 for that specific personalization requirement. The system 110 may store the identified parameter set 215 with the associated pertinent data domains 235 in the augmented reality data library. The system 110 may access the augmented reality data library for using the identified parameter set 215 with the associated pertinent data domains 235 for processing a similar personalization requirement in future (further explained by way of subsequent Figs.).

In operation, the system 110 may be configured for augmenting various products onto an AR compatible medium for facilitating procurement requirements of an individual or an organization. The system 110 may augment various goods and services from various e-commerce platforms through the processor 120, the augmented reality data generator 130, the updater 140, the modeler 150 and the monitor 160. As mentioned above, the processor 120 may be coupled to the augmented reality data generator 130, the updater 140, and the monitor 160. The augmented reality data generator 130 may receive the query 205 from a user of the system 110. The query 205 may be associated with the personalization requirement relevant for procurement operations. In an example, the query 205 may be to procure furniture for a room. In an example, the query 205 may be to regenerate a previously augmented product similar to the product 210 onto the AR compatible medium. The query 205 may be received onto an AR compatible medium.

The augmented reality data generator 130 may obtain the representative data 220 that may be associated with the query 205. The representative data 220 may be obtained onto an AR compatible medium. In an example, the representative data 220 may constitute an augmented view of an environment that may be associated with the query 205. The augmented reality data generator 130 may identify at least one context associated with the environment, which may be relevant for processing the query 205. For example, the representative data 220 may indicate the requirement of a table for the environment represented by the representative data 220. In an example, the representative data 220 may detect the requirement for multiple products for the associated environment, however, the query 205 may only be related to the requirement of one product like the product 210. For example, the representative data 220 may indicate that the table may also require a set of chairs for completion. However, the query 205 may only relate to the procurement of a table. The augmented reality data generator 130 may obtain the product parameter set 215 from a plurality of data sources. The plurality of sources may be various e-commerce retail platforms. The product parameter set 215 may be related to the product 210. In an example, the product parameter set 215 may include information on various brands, dimensions of the product 210, availability of the product 210 across various e-commerce platforms, and the like. The augmented reality data generator 130 may implement the artificial intelligence component 225 for sorting the product parameter set 215, the representative data 220, and the context identified for the representative data 220 into the plurality of data domains 230. In an example, the product parameter set 215 may be obtained from multiple e-commerce platforms and each e-commerce platform may have contextualized the products in a different pattern. The artificial intelligence component 225 may sort through various patterns and generate a single pattern for products listed across various e-commerce platforms for enhancing ease of operation. For example, one e-commerce platform may mention a product category with a name "X" and a second e-commerce platform may mention the same product category with a synonymous name "Y". The augmented reality data generator 130 may implement the artificial intelligence component 225 and identify that both product categories with names "X" and "Y" may be referring to same products and, therefore sort the same into one data domain. The artificial intelligence component 225 may be one of a data extractor, a data classifier, a data associator, a data comparer, a relationship extractor, and a dependency parser and the like. In an example, the artificial intelligence component 225 may implement techniques like Natural Language Processing (NLP) and the like for sorting the parameter data into the plurality of data domains 230. For the sake of brevity and technical clarity, a detailed explanation of the techniques like may be presented by way of subsequent Figs and is not included here.

The system 110 may evaluate each domain from the plurality of data domains 230 for identifying the pertinent data domains 235. In an example, the system 110 may identify at least one domain from the plurality of data domains 230 as being the pertinent data domain 235 for the personalization requirement. The system 110 may be configured to use the pertinent data domains 235 hereon, for processing the personalization requirement. In accordance with various examples of the present disclosure, the pertinent data domains 235 may be domains from the plurality of data domains 230, which may have been identified by the system 110 as being having a greater prevalence on the processing of the personalization requirement (explained in detail by way of subsequent Figs. along with exemplary embodiments).

As mentioned above, when the augmented reality data generator 130 of the system 110 has identified the parameter set 215 and the pertinent data domains 235 for processing the personalization requirement, the updater 140 may detect a modification in at least one of the plurality of data sources from where the parameter data may have been obtained from. Further, the modification detected in the plurality of data sources may lead to a modification in the parameter data. In an example, the modification in the parameter data may lead to a modification in at least one of the plurality of data domains 230. In an example, the modification in the plurality of data domains 230 may lead to identifying a new set of the plurality of data domains 230. In an example, the modification in the plurality of data domains 230 may lead to identifying a new set of values for the plurality of data domains 230 identified before the modification on the parameter data may have been detected. Additionally, the modification in the product parameter data may lead to a modification in at least one of the sets from the parameter set 215. In an example, the modification in the parameter set 215 may lead to the identification of new parameter set 215. In an example, the modification in the parameter set 215 may lead to the identification of new values for the parameter set 215 identified before the modification on the parameter data may have been detected. The system 110 may be configured to update the pertinent data domains 235 based on the respective modifications in the parameter set 215 and the plurality of data domains 230. The system 110 may use the updated pertinent data domains 235 hereon for processing the personalization requirement.

The modeler 150 may be configured to obtain the updated pertinent data domains 235 from the updater 140. Further, the modeler 150 may obtain the identified parameter set 215 from the augmented reality data generator 130. In an example, the modeler 150 may obtain the updated parameter set 215 from the updater 140. The modeler 150 may establish a product augmented reality model 260 corresponding to the personalization requirement associated with the query 205 by performing the first cognitive learning operation 265 on a domain from the updated pertinent data domains 235 and the identified parameter set 215. The first cognitive learning operation 265 may include the deployment of various tools and techniques (explained in detail by way of subsequent Figs.) for the generation of the product augmented reality model 260. Accordingly, the system 110 may detect a modification in the parameter data after the product augmented reality model 260 may have been established. The modification in the parameter data may lead to respective modifications in the parameter set 215 and the updated pertinent data domains 235 after they have been deployed by the system 110 for the generation of the product augmented reality model 260. The modeler 150 of the system 110 may be configured so as to update the product augmented reality model 260 corresponding to the update in the updated pertinent data domains 235. The system 110 may be configured to store all the product augmented reality model 260 for future use.

The monitor 160 may obtain the identified parameter set 215 related to the product 210 and determine a peripheral product parameter set 240 from the identified parameter set 215. The peripheral product parameter set 240 may complement the parameter set 215 related to the product 210. The monitor 160 may determine features of the products identified as related to the product 210 and determine the peripheral product parameter set 240. In an example, the peripheral product parameter set 240 may include features, availability, compatibility, brand information for all related products. The monitor 160 may implement a second cognitive learning operation 245 to establish a peripheral augmented reality model 250 corresponding to the peripheral product parameter set 240. In an example, the second cognitive learning operation 245 may include determining the compatibility of the products identified as related to the product 210 with the product 210 associated with the query 205 (explained in detail by way of subsequent figures). The peripheral augmented reality model 250 may include augmenting the products identified as related to the product 210 onto the AR compatible medium along with the product augmented reality model 260. In an example, second cognitive learning operation 245 may determine a set of chairs as being compatible to a table, which has been identified as a preferred choice by a user for the fulfillment of the query 205. The second cognitive learning operation 245 may augment the set of chairs identified onto the AR compatible medium along with the table, which would be augmented onto the AR compatible medium as part of the product augmented reality model 260 (explained further by way of subsequent Figs.).

The monitor 160 may generate the augmented reality result 255 corresponding to the personalization requirement. The augmented reality result 255 may include the product augmented reality model 260 relevant for a resolution to the query 205 indicated by the personalization requirement. In an example, the system 110 may deploy multiple product augmented reality models 260 for generating the augmented reality result 255. In an example, the multiple products augmented reality models 260 may present various options to a user for the fulfillment of the query 205. In an example, the system 110 may generate a modification in the augmented reality result 255 based on the modification in the product augmented reality model 260. In an example, the system 110 may require permission from the user for generating the modification in the augmented reality result 255 based on the modification in the product augmented reality model 260. In an example, the system 110 may generate the modification in the augmented reality result 255 based on the modification in the product augmented reality model 260 through using a pre-set condition by the user. The pre-set condition may refer to permission given by the user for updating the augmented reality result 255 if the system 110 may detect a specified set of modifications in the product augmented reality model 260. In an example, the augmented reality result 255 may be generated in an electronic format. In an example, the user may be electronically notified regarding a modification in any of the pertinent data domains 235, the parameter set 215, the product augmented reality model 260, and the augmented reality result 255. In an example, the augmented reality result 255 may include presenting the user with various offers which may have been generated by the system through combining the product augmented reality model 260 and the peripheral augmented reality model 250. The system 110 may facilitate various e-commerce platforms in making collaborations for various products and present the same to the user (explained in detail by way of subsequent Figs.). In an example, the augmented reality result 255 may include various frames, which may be presented to the user as multiple options for fulfillment of the query 205. The frames may include relevant information about the product 210 from various sources and also information on various related products identified for the product 210 along with various offers and collaborations generated for the product 210. For example, the augmented reality result 255 for a query 205 related to procurement of a table may include information on attributes, brands, colours, dimensions, and availability of various models of tables along with various offers including combined offers of buying a set of chairs or a set of vase along with for complementing the table (explained in detail by way of subsequent Figs.).

In accordance with various embodiments of the present disclosure, the system 110 may facilitate generating an augmentation based on the multisource augmented reality model. The system 110 may perform multi-store e-commerce data modeling based on the multisource augmented reality model. The system 110 may perform a recommendation generation operation for various products like the product 210 based on the multisource augmented reality model. The system 110 may perform an affinity analysis based on the multisource augmented reality model. The system 110 may perform an operation for profiling user data based on the multisource augmented reality model. The system 110 may perform the generation of augmented reality insights based on a compatibility check performed by the multisource augmented reality model. The system 110 may deploy a layered recommendation process for performing the recommendation generation operation for various products like the product 210 based on the multisource augmented reality model. The system 110 may perform a viewpoint generation based on the multisource augmented reality model for the user. The system 110 may facilitate generating sales packages and various offers for a user based on the multisource augmented reality model. The system 110 may facilitate mapping various offers and sales packages based on the multisource augmented reality model. The system 110 may facilize mapping various offers and across multiple e-commerce platforms based on multisource augmented reality model (explained in detail by way of subsequent Figs.).

Figure 3:
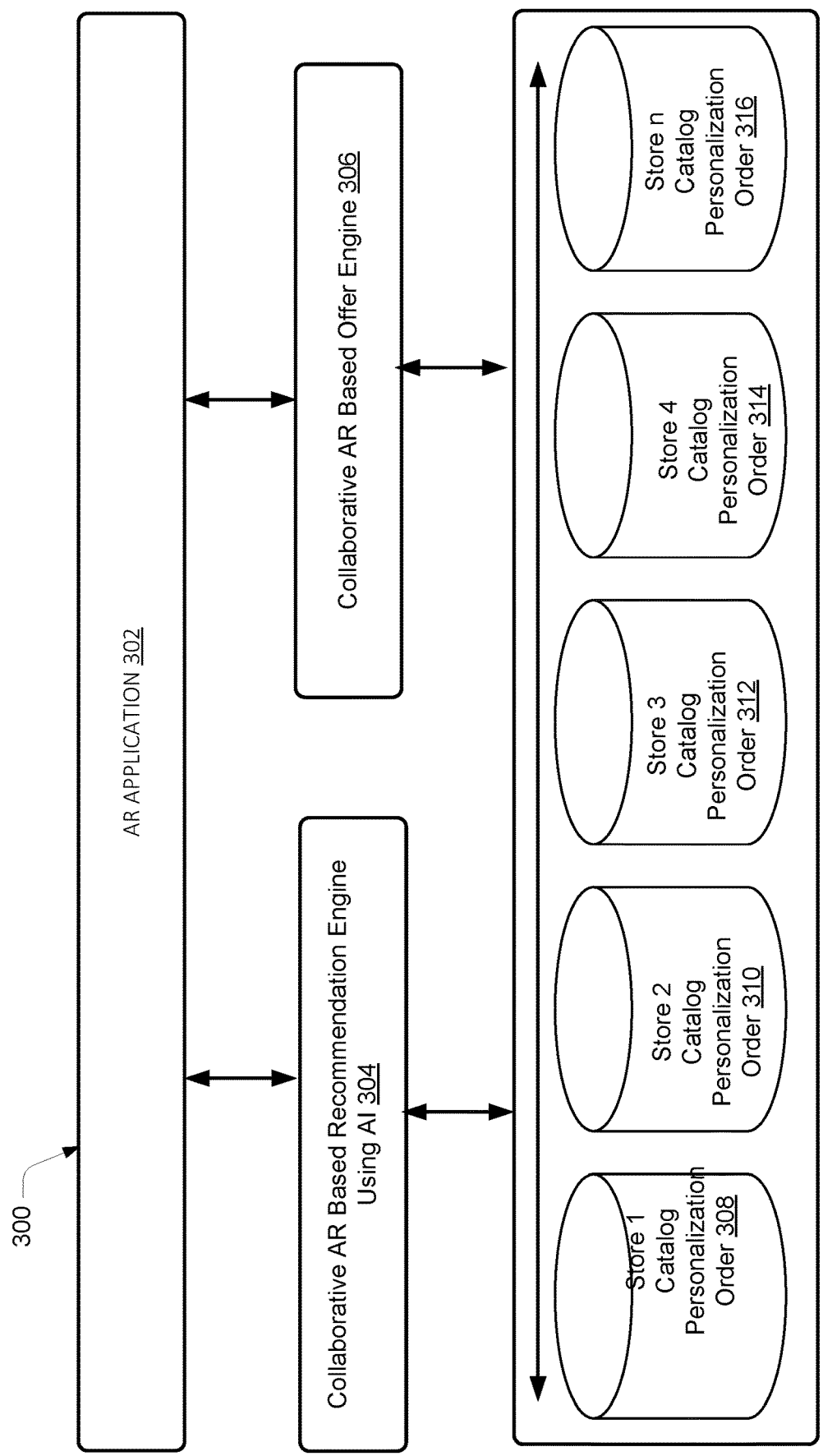
FIG. 3 illustrates key areas of a multisource augmented reality model, according to an example embodiment of the present disclosure.

FIG. 3 illustrates key areas of a multisource augmented reality model 300, according to an example embodiment of the present disclosure. Any of the components of the system 110 may be used for purpose of the multisource augmented reality model 300. The multisource augmented reality model 300 may be referred to as the model 300 hereinafter. In accordance with an embodiment of the present disclosure, the model 300 may include an AR application 302, a recommendation engine 304, and an offer engine 306 and personalization store data across various stores or e-commerce platforms. The model 300 may include, for example, a store 1 catalog 308, a store 2 catalog 310, a store 3 catalog 312, a store 4 catalog 314, and a store n catalog 316. Each of the store 1 catalog 308, the store 2 catalog 310, the store 3 catalog 312, the store 4 catalog 314, and the store n catalog 316 may include information about various products and sales offers for various products. In an example, each of the store 1 catalog 308, the store 2 catalog 310, the store 3 catalog 312, the store 4 catalog 314, and the store n catalog 316 may be in communication with the offer engine 306 and the recommendation engine 304.

The AR application 302 may be configured to receive the query 305 from the user. The model 300 may integrate with multiple stores and catalogs across various e-commerce platforms. In an example, data may flow from stores and insights of data may be used for generation of the best recommendation, compatibility check of products and user filtering of products based on AR data insights and personalization. In operation, the AR application 302 may be the AR compatible medium for augmenting various products for the user. The AR application 302 may obtain the representative data 220 and the environment from a user. The AR application 302 may be in communication with the recommendation engine 304 and the offer engine 306. In an example, the recommendation engine 304 and the offer engine 306 may receive an input from the AR application 302. The recommendation engine 304 and the offer engine 306 may provide an input to the AR application 302. In an example, the recommendation engine 304 and the offer engine 306 may receive an input from each of the store 1 catalog 308, the store 2 catalog 310, the store 3 catalog 312, the store 4 catalog 314, and the store n catalog 316. The recommendation engine 304 and the offer engine 306 may provide an input to each of the store 1 catalog 308, the store 2 catalog 310, the store 3 catalog 312, the store 4 catalog 314, and the store n catalog 316. The recommendation engine 304 and the offer engine 306 have been explained in detail by way of subsequent Figs.

Figure 4:
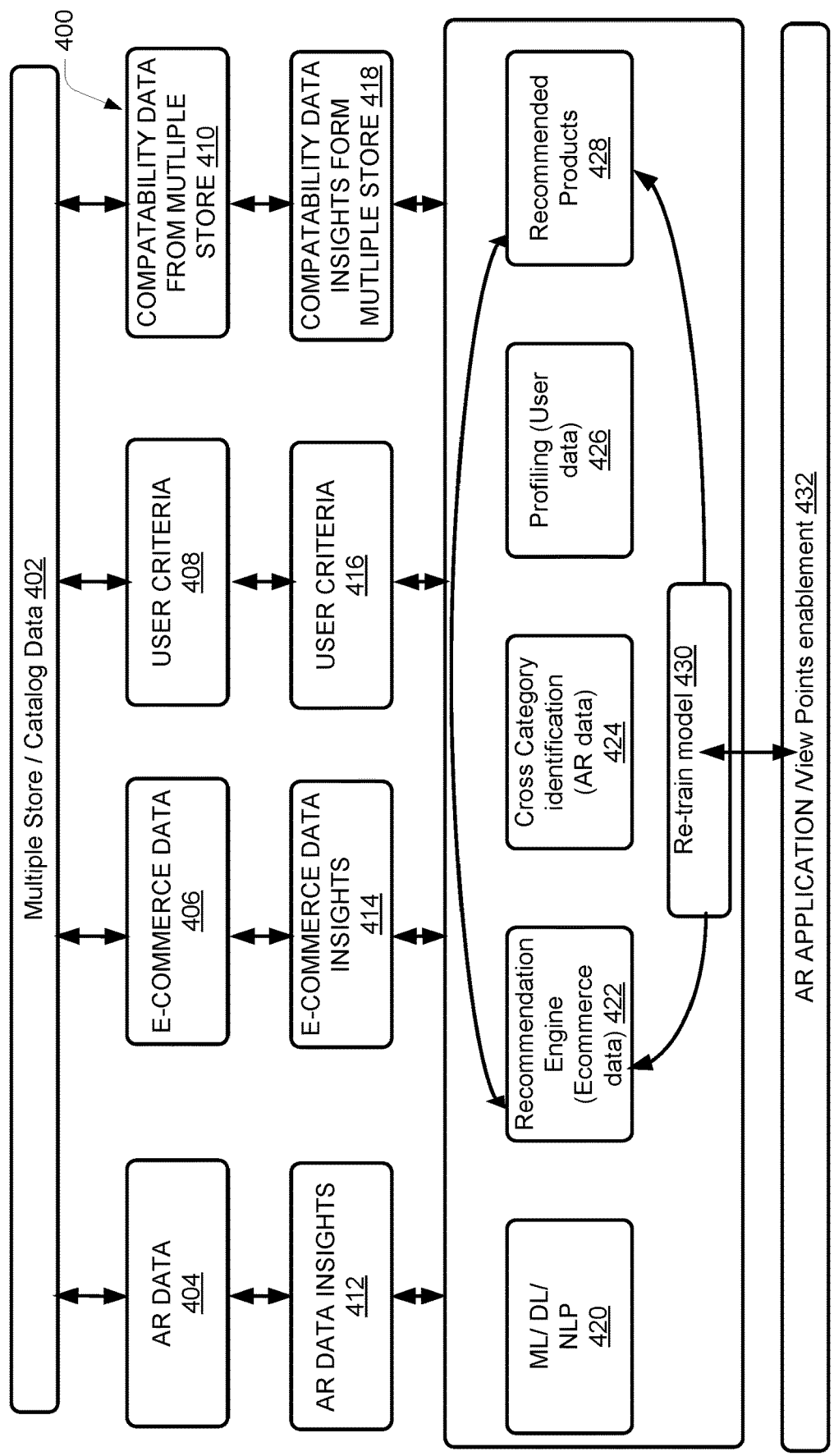
FIG. 4 illustrates a process flowchart for generating an augmentation based on the multisource augmented reality model, according to an example embodiment of the present disclosure.

FIG. 4 illustrates a flowchart for a process 400 for generating an augmentation based on the multisource augmented reality model, according to an example embodiment of the present disclosure. Any of the components of the system 110 may be used for the purpose of the process 400. The process 400 may include a catalog data 402. The catalog data 402 may be obtained from the plurality of data sources. In an example, the plurality of data sources may include multiple e-commerce platforms. The process 400 may include an AR application 432. The AR application 432 may be a user interface for interaction with the system 110. The AR application 432 may be the AR compatible medium for augmenting various products for the user. The AR application 432 may act as an interface for presenting the catalog data 402 to a user. The process 400 may further include an AR data component 404, an e-commerce data component 406, a user criteria 408, and a compatible data component 410. In an example, the AR data component 404, the e-commerce data component 406, the user criteria 408, and the compatible data component 410 may receive input from the catalog data 402. The AR data component 404, the e-commerce data component 406, the user criteria 408, and the compatible data component 410 may provide input for updating the catalog data 402.

The AR data component 404 may be used by the system 110 for determining a set of AR data insights 412. The AR data insights 412 may be deployed by the system 110 for updating the AR data component 404. The e-commerce data component 406 may be used by the system 110 for determining a set of e-commerce data insights 414. The e-commerce data insights 414 may be deployed by the system 110 for updating the e-commerce data component 406. The user criteria 408 may be used by the system 110 for determining a set of user criteria insights 416. The user criteria insights 416 may be deployed by the system 110 for updating the user criteria 408. The compatible data component 410 may be used by the system 110 for determining a set of compatible data insights 418. In an example, the compatible data component 410 may include data from various stores. The compatible data insights 418 may be deployed by the system 110 for updating the compatible data component 410.

The process 400 further includes a natural language processing component 420, a recommendation engine 422, a cross-category identification 424, a user profiling component 426, and a list of recommended products 428. In an example, the natural language processing component 420 may be used by the process 400 for implementing the artificial intelligence component 225 for sorting the representative data (AR data component 404), parameter set (e-commerce data component 406, and user criteria 408), and context identified through the environment) in the plurality of data domains 230. The plurality of data domains 230 may be used for identification of the pertinent data domains 235. The pertinent data domains 235 may be used by the process 400 hereon for further analysis and augmentation. The pertinent data domains 235 may be obtained from the natural language processing component 420 by the recommendation engine 422. The recommendation engine 422 has been explained in detail by way of FIG. 6 below.

The process 400 further includes cross-category identification 424. The recommendation engine 422 may generate input for the cross-category identification 424. The cross-category identification 424 may obtain input from the AR data component 404 through the AR data insights 412 and the recommendation engine 422. The cross-category identification 424 may further include a compatibility factor and a recommendation. The compatibility factor may include fetching cross and up-sell products with a compatibility check. The recommendation may be based across various stores/catalogs with personalization and the AR data component 404 and the AR data insights 412 from the user. The cross-category identification 424 has also been referred to as an affinity analysis and has been explained in detail by way of FIG. 7 below.

The process 400 further includes the user profiling component 426. The cross-category identification 424 may lead to the user profiling component 426 in the process 400. The user profiling component 426 may include profiling product data based on the user criterion 408 and the user criteria insights 416. The user profiling component 426 may generate a recommendation based on user personalization criteria, compatibility & personalization across stores. The user profiling component 426 has been explained in detail by way of FIG. 8.

The process 400 may further include the list of recommended products 428. The user profiling component 426 along with the recommendation engine 422 may generate the list of recommended products 428. The list of recommended products 428 may include a list of guided next products & cross/up-sell products. The list of recommended products 428 has been explained in detail by way of FIG. 9

In an example, the list of recommended products 428 may be obtained by the recommendation engine 422 for performing a model re-training 430. The model re-training 430 may include updating the product augmented reality model 260 and the peripheral product augmented reality model 250. The model re-training 430 may lead to the updated product augmented reality model 260 and the updated peripheral product augmented reality model 250, which may be augmented onto the AR application 432.

The process 400 may be configured so that each of the natural language processing component 420, the recommendation engine 422, the cross-category identification 424, the user profiling component 426, and the list of recommended products 428 may receive inputs from each of the AR data insights 412, the e-commerce data insights 414, the user criteria insights 416, and the compatible data insights 418. In an example, the process 400 is configured so that each of the natural language processing component 420, the recommendation engine 422, the cross-category identification 424, the user profiling component 426, and the list of recommended products 428 may provide inputs for updating each of the AR data insights 412, the e-commerce data insights 414, the user criteria insights 416, and the compatible data insights 418.

Figure 5:
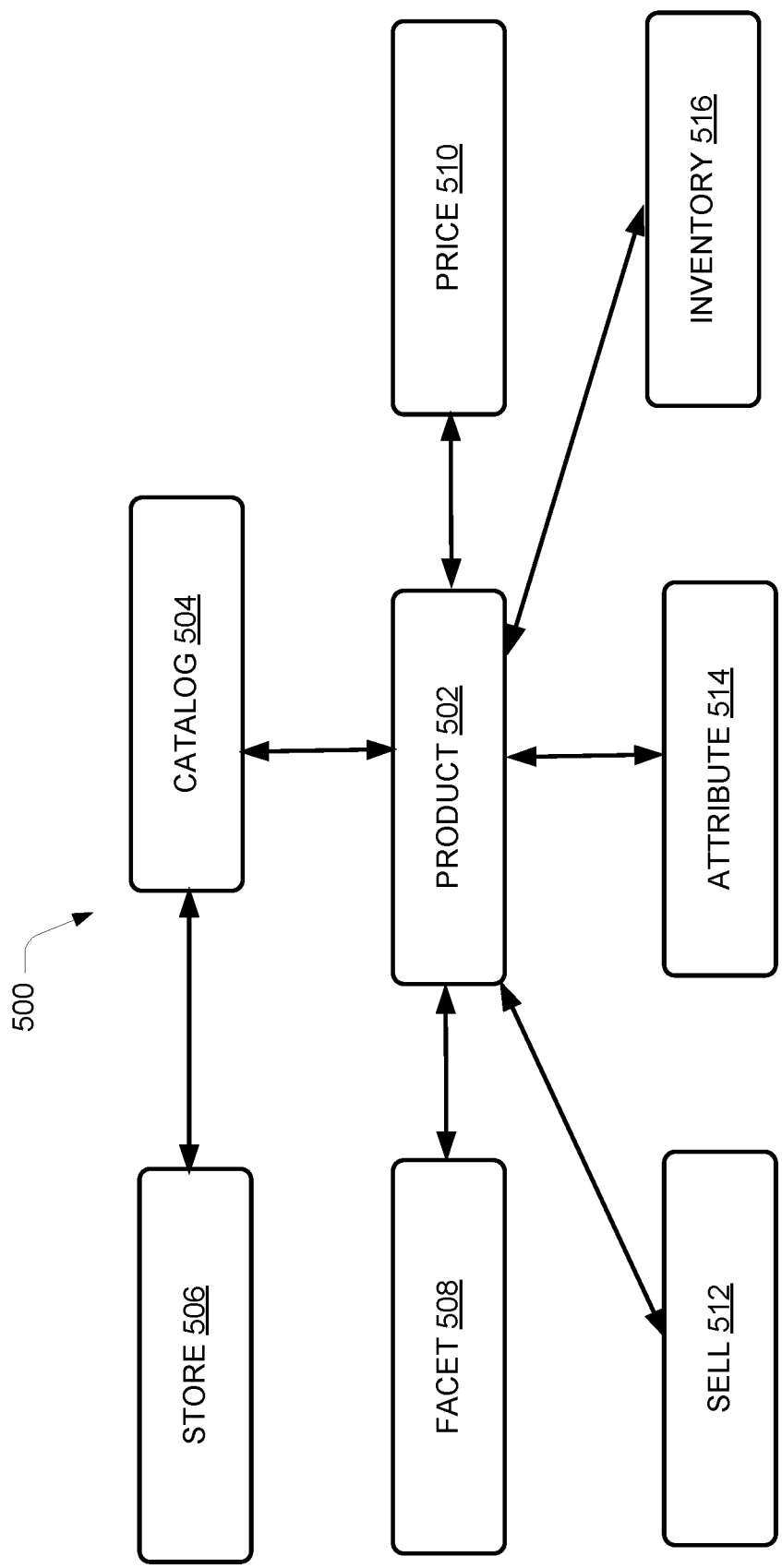
FIG. 5 illustrates a process flowchart of multi-store e-commerce data modeling based on multisource augmented reality model, according to an example embodiment of the present disclosure.

FIG. 5 illustrates a flow diagram 500 of multi-store e-commerce data modeling based on multisource augmented reality model, according to an example embodiment of the present disclosure. Any of the components of the system 110 may be used for the purpose of the flow diagram 500. The flow diagram 500 may illustrate an exemplary embodiment of the plurality of data domains 230. As mentioned above the system 110 may determine the product parameter set 215 for each product 210. The flow diagram 500 illustrates various categories of data determined by the system 110 for a product 502. In an example, the product 502 may be similar to the product 210. In an example, a product 502 may include a catalog data set 504, a store data set 506, a facet data set 508, a price data set 510, a selling information set 512, an attribute set 514, and an inventory information set 516. Each of the catalog data set 504, the store data set 506, the facet data set 508, the price data set 510, the selling information set 512, the attribute set 514, and the inventory information set 516 may be determined by the system 110 through the plurality of data sources. The plurality of data sources may include various e-commerce platforms. In an example, each of the catalog data set 504, the store data set 506, the facet data set 508, the price data set 510, the selling information set 512, the attribute set 514, and the inventory information set 516 may be stored in a different format by various e-commerce platforms. The system 110 may be configured to extract information from each of the e-commerce platforms and convert the extracted information into a single pattern. In an example, the information converted into a single pattern may constitute a part of the plurality of data domains 230.

In an example, each product 502 may be attributed to a product identification number, a product name, a product description, and an attribute identification number. The product 502 may be connected to the catalog data set 504, the store data set 506, the facet data set 508, the price data set 510, the selling information set 512, the attribute set 514, and the inventory information set 516 through various communication channels. A change in any of the catalog data set 504, the store data set 506, the facet data set 508, the price data set 510, the selling information set 512, the attribute set 514, and the inventory information set 516 may lead to a change in the information stored in the system 110 for the product 502.

The catalog data set 504 may further include details such as a catalog name, a catalog identification number, a catalog description and the like. The store data set 506 may further include a store name, a store identification number, a store description, and the like. In an example, the catalog data set 504 and the store data set 506 may be connected to each other through. The facet data set 508 may include a facet identification number for the product 502, a facet description, a facet name and the like. The price data set 510 may further include price information for the product 502. The selling information set 512 may include information on various parts of the product, various selling types including a new products, a reselling, a used product, a refurbished product and the like. The attribute set 514 may include information on various attributes of the product 502. The inventory set 516 may include information on inventory updates for the product 502 including store availability, locations, delivery information, and the like.

As mentioned above, the system 110 may extract information from various sources and generate an e-commerce data model may be used as a common model for communicating between different e-commerce systems. The system 110 may need a common data model as there may be multiple stores included and data across the store needs to communicate in a common language for the systems to come up with relevant recommendations and offers and collaborate with another store for combined selling's options. For example, a store A may call products as "products" in their data model whereas a store B may call products as "items" in their data model. So as part of transformation, a common data model such as the model 500 may be applied to all the data collected across the multiple stores.

Figure 6:
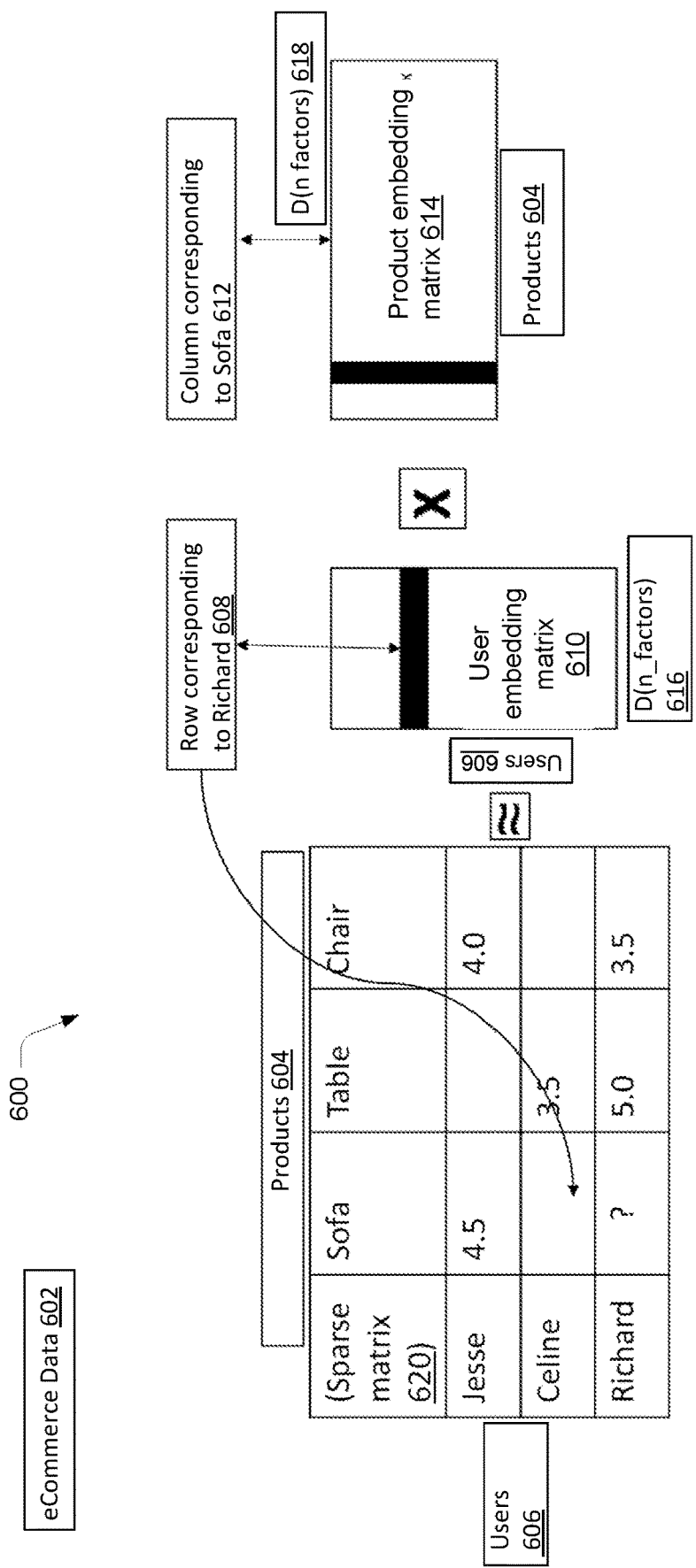
FIG. 6 illustrates algorithmic details for recommendation generation based on multisource augmented reality model, according to an example embodiment of the present disclosure.

FIG. 6 illustrates algorithmic details for a recommendation generation engine 600 based on the multisource augmented reality model, according to an example embodiment of the present disclosure. Any of the components of the system 110 may be used for the purpose of the recommendation generation engine 600. In an example, the recommendation engine 304 may be similar to the recommendation generation engine 600. The recommendation generation engine 600 may include an e-commerce data set 602, a product categorization 604, and a user categorization 606. In an example, the e-commerce data set 602 may be the same as that explained by model 500 by way of FIG. 5. The product categorization 604 may include various columns for categorizing information on various products like the product 210. The user categorization 606 may include various rows of data for categorizing information on various users. In an example, the information for a user may be collected by the system 110 through user profiling (explained in detail by way of subsequent Figs.). The product categorization 604 and the user categorization 606 may be collated to for formation of a matrix 620 including various rows of data for the user categorization 606 and various columns of data for the product categorization 604. The user categorization 606 may further include a user embedding matrix 610. The product categorization 604 may further include a product embedding matrix 614. In an example, the system 110 may be so configured that the embeddings may be learned by the system through a deep learning method. In an example, the methods such as PyTorch/fastai/Deep Learning library, CollabFilterDataset.get_learner (K, batch size, optimizer) may be used to obtain the user embedding matrix 610 and the product embedding matrix 614. The deep learning method may include representing each user and each product in a K dimensional embedding space. The intuition may be that if a user and a product may be close in embedding space, then the user may be likely to rate the product high. This intuition may be used to capture the interaction between the user categorization 606 and the product categorization 604. The system 110 may capture the bias values for the user categorization 606 and the product categorization 604. A bias may represent an inherent nature of the entity independent of its interaction with other entities. The deep learning algorithm may further include a rating for a new user/product combination as a sum total of user bias, product bias, and a dot product of the user embedding and the product embedding. This may be done using a predict function.

For example, the user embedding matrix 610 may include a row 608. The row 608 may correspond to data for a user. The system 110 may pull out the row 608 for a particular user through the use of various D(n_factors) 616. The product embedding matrix 614 may include a column 612. The column 612 may correspond to data related to a product.

The system 110 may pull out the column 612 for a particular product throughthe use various D(n_factors) 618. The system 110 may apply the methods mentioned above to create the matrix 620 through the row 608 from the user embedding matrix 610, and the column 612 from the product embedding matrix 614.

In operation, for example, the query 205 may relate to the purchase of a table for a room. The user may upload an environment onto the AR compatible medium, which may reflect a space for which the table may need to be procured. The system 110 may collect the representative data 220 from the user environment, AR data from the AR compatible medium, and E-commerce personalization data for each user through various user personal accounts over various e-commerce platforms. The system 110 may generate a customer context using the data collected thus far. In an example, the representative data 220 may include a room color, a room size, a room pattern, other products in the room and the like. The system 110 may identify products with various product identification numbers use the same for future reference. In an example, the matrix 620 may be generated using the e-commerce dataset 602, which may be have been generated from a single e-commerce platform.

Figure 7:
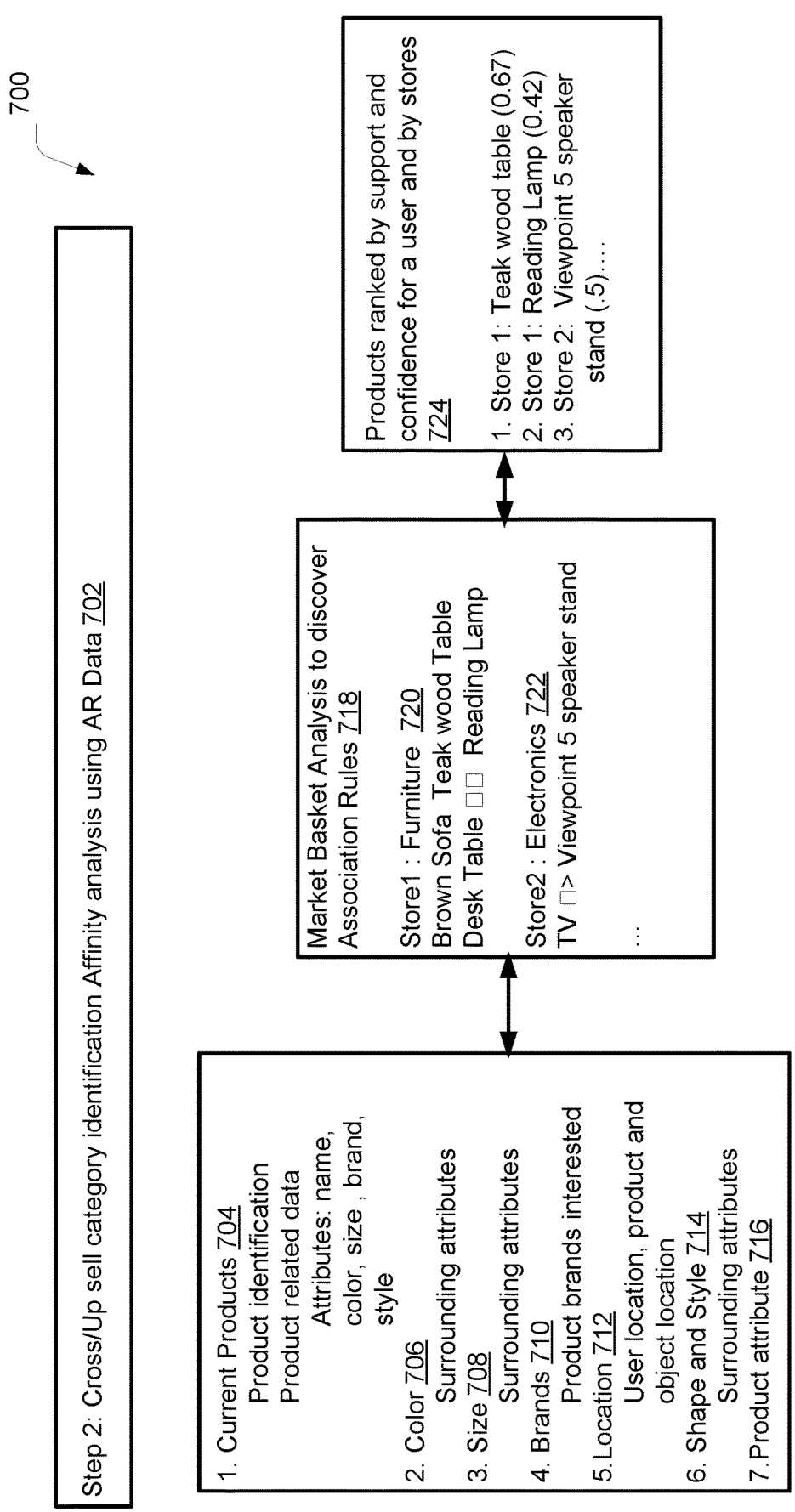
FIG. 7 illustrates a process flowchart for an affinity analysis based on the multisource augmented reality model, according to an example embodiment of the present disclosure.

FIG. 7 illustrates a flowchart for a process 700 for an affinity analysis based on the multisource augmented reality model, according to an example embodiment of the present disclosure. Any of the components of the system 110 may be used for the purpose of the process 700. As mentioned above the system 110 may collect the representative data 220 from the environment and may identify at least one context therein for the purpose of processing the query 205. In an example, the system 110 may perform an affinity analysis based on the representative data 220 for the generation of recommendations for the products 210 for a user. The model 700 describes an affinity analysis 702 as an exemplary embodiment of the present disclosure. The affinity analysis 702 may include drawing data from the representative data 220. In an example, the affinity analysis 702 may include a current product 704, a color set 706, a size set 708, a brand set 710, a location set 712, a style set 714, and an attribute set 716. The current product 704 may include information on product attributes, product identification data and the like. The affinity analysis 702 may further include performing a market basket analysis 718. The market basket analysis 718 may determine a set of association rules between various products across various stores or e-commerce platforms. For example, the market basket analysis 718 may consider a furniture category 720 from a "Store 1". The market basket analysis 718 may determine that a brown sofa set for example will match well with a teak wood table from the information drawn from the current product 704, the color set 706, the size set 708, the brand set 710, the location set 712, the style set 714, and the attribute set 716. In an example, the market basket analysis 718 may determine that a desk table may require a reading lamp as well. In another example, the market basket analysis 718 may consider an electronics category 722. In another example, the market basket analysis 718 may determine that a television set may require a speaker stand as well from the information from the set of current product 704, the color set 706, the size set 708, the brand set 710, the location set 712, the style set 714, and the attribute set 716. The system 110 may be configured to attribute product rank 724 to each current product 704. The attribute product rank 724 may be based on support and confidence for a user and also on stores. The support and confidence rules may be learned from the representative data 220 using a data mining technique called affinity analysis. In an example, the technique may use the apriori algorithm to learn the support and confidence rules. The Apriori algorithm may create a list of association of a product/set of products with another product or another group of products. For each of this association, it may check the percentage of the time this association appears together. This percentage is called support. The higher the support, the greater the likelihood that these products are purchased together. Rules with the top 10% of support containing the product from AR dataset may be used for the next step. In the next step, the system 110 may check how often the rule may be true. It may be the proportion of transactions that may contain a product vs the transactions without that product. This proportion is called confidence. A minimum of 50% is needed for a threshold. The higher the confidence, the more useful the rule. In an example, the system 110 may consider a purchasing history of a user and browsing history of a user for identifying user preferences and buying frequency. Such information may lead to the generation of more confidence level for a particular user. The attribute product rank 724 may be used by the system 110 for generating recommendations for the user on the AR compatible medium.

For example, the affinity analysis 702 may determine that a sofa product, a table product, and a chair product may be related to each other. The system 110 may deploy the representative data 220, and the pertinent data domains 235 for determining a product price range, brand information, pattern, color of the product and the like for a generation of a support parameter and a confidence parameter for each product. The system 110 may perform across e-commerce store mapping for generating the support and the confidence parameter values for various products.

Figure 8:
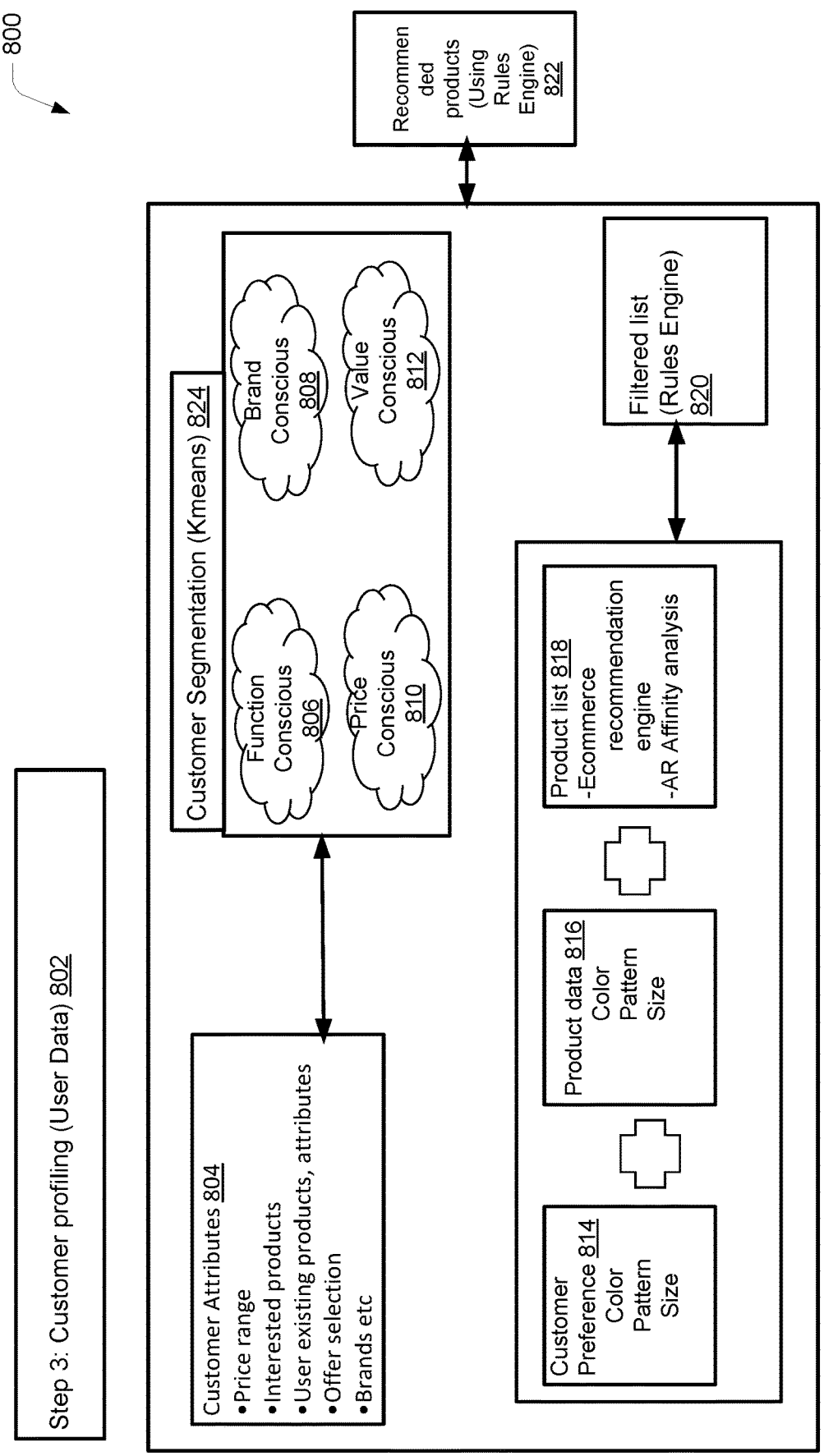
FIG. 8 illustrates a process flowchart for profiling user data based on multisource augmented reality model, according to an example embodiment of the present disclosure.

FIG. 8 illustrates a flowchart for a process 800 for profiling user data based on multisource augmented reality model, according to an example embodiment of the present disclosure. Any of the components of the system 110 may be used for the purpose of the process 800. The flowchart 800 illustrates a user profiling process 802 (referred to as process 802 hereinafter). The process 802 may include determining a set of customer attributes 804. In an example, the set of customer attributes 804 may be obtained by the system as part of the representative data 220 through the AR compatible medium. In an example, the set of customer attributes 804 may include a preferred price range, products of interest, existing products purchased earlier by the user, offer a selection from the user end, preferred brands, and the like. In an example, the set of customer attributes 804 may form the product parameter set 215. In an example, the process 802 may deploy the pertinent data domains 235 for user profiling. In an example, the pertinent data domains 235 may include preferred data selected by the user. In an example, the system may deploy the augmented reality data library for determining user preferences. The set of customer attributes 804 may be deployed for a customer segmentation step 824. In an example, the system 110 may perform the customer segmentation step 824 through the process 802 using a K-means method. The K-means method may include customer segmentation using K-means clustering to form, for example, four clusters. The clusters may be based in a price consideration, a brand consideration, a function consideration, and a value consideration. The K-means method may further iteratively determine the distance between centroids and the points and updating centroids as a mean of all assigned points. The customer segmentation step 824 may deploy data from a function conscious data set 806, a brand conscious data set 808, a price-conscious data set 810, and a value conscious data set 812. In an example, the function conscious data set 806, the brand conscious data set 808, the price conscious data set 810, and the value-conscious data set 812 may be a part of the pertinent data domains selected by the system 110 for processing the query 205. In an example, the function conscious data set 806, the brand conscious data set 808, the price conscious data set 810, and the value-conscious data set 812 may be obtained by the system as part of parameter data.

In accordance with an example of the present disclosure, the process 802 may further include determining a customer preference 814, a product data set 816, and a product list 818. As mentioned above, the system 110 may deploy various means for determining the customer preference 814. The system 110 may obtain the product data set 816 through various e-commerce platforms (as mentioned above). The system 110 may obtain the product list 818 through various e-commerce platforms (as mentioned above). The process 802 may implement the first cognitive operation 265 for determining the customer preference 814, the product data set 816, and the product list 818 for a particular query 205. The process 802 may compare the customer preference 814, the product data set 816, and the product list 818 for generating a rule engine 820. For example, the process 82 may filter data from the product data set 816, and the product list 818 based on the customer preference 814. For example, color, brand, dimensions preference for a product may be set by a user and the system 110 may consider the same for filtering data and deploying the rule engine 820. In an example, the rule engine 820 may be deployed for customer context building using the representative data 220. For example, the rule engine 820 may be used to process to build a preference database for a customer (also explained by way of FIG. 6). The preference database for a customer may include a price range, a brand interest, a pattern, and the like.

The rule engine 820 may be used in conjunction with the set of customer attributes 804 and the customer segmentation step 824 for the generation of a recommendation 822. The recommendation 822 may include a list of products relevant for the customer preference 814 considering the product data set 816, and the product list 818. In an example, the system 110 may deploy the process 802 for matching the customer segment and filtered products using the rule engine 820 for the generation of final recommendation 822. For example, the system may recommend accessories from luxury brands for brand conscious buyers. In an example, the system 110 may establish the product augmented reality model 260 for the query 205 based on the rule engine 820. In an example, the system 110 may establish various product augmented reality models 260 for the query 205 based on the rule engine 820.

Figure 9:
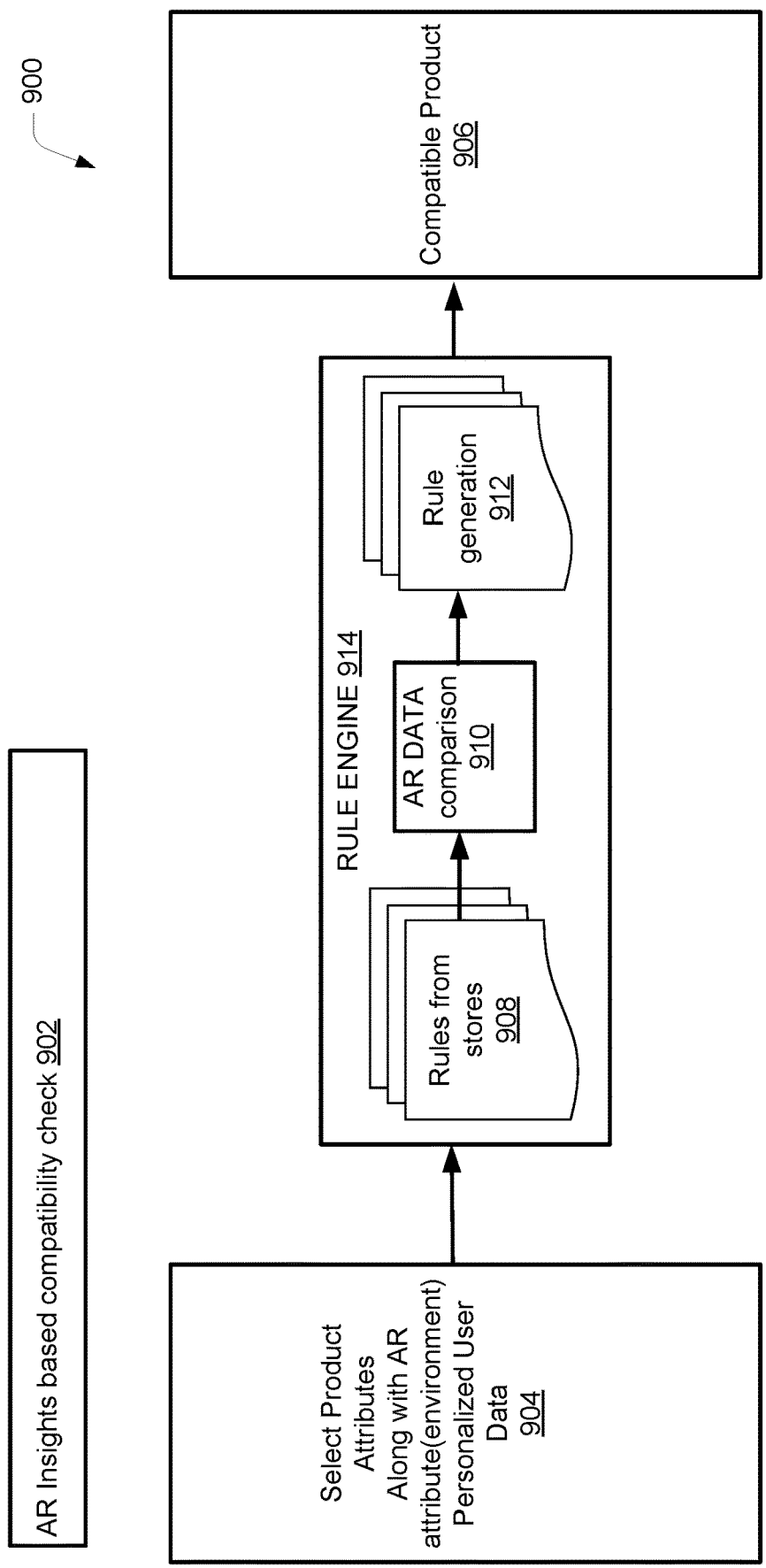
FIG. 9 illustrates a process flowchart for the generation of augmented reality insights based on a compatibility check performed by the multisource augmented reality model, according to an example embodiment of the present disclosure.

FIG. 9 illustrates a flowchart for a process 900 for the generation of augmented reality insights based on a compatibility check 902 performed by the multisource augmented reality model, according to an example embodiment of the present disclosure. Any of the components of the system 110 may be used for the purpose of the process 900. The compatibility check 902 may include deploying a personalized user data 904, a rule engine 914, and a compatible product 906. The personalized user data 904 may include selecting product attributes for the product 210 using any of the means mentioned above. The personalized user data 904 may further include selection AR attributes from the environment that has been uploaded by the user onto the AR compatible medium for processing the query 205. The compatibility check 902 may determine insights from the environment in the form of the representative data 220. The representative data 220 may include brand information about products already present in the environment. The representative data 220 may include a dimensional analysis of the products present in the environment. The representative data 220 may include any other attributes of the products present in the environment. A comparison of the representative data 220 and the product attributes for the product 210 may result in the formation of the personalized user data 904. The system 110 may store the personalized user data 904 in the augmented data library for future reference.

The compatibility check 902 may further include the rule engine 914. The rule engine 914 may further include a set of rules from various stores 908, an AR data comparison 910, and a rule generation 912. The rule engine 914 may communicate with various stores and obtain the set of rules from various stores 908 for the product 210 associated with the query 205. The set of rules from various stores 908 may include the information above various offers, price considerations, product dimensions, products attributes, and the like. The rule engine 914 may obtain from the personalized user data 904. The rule engine 914 may compare the set of rules from various stores 908 with the insights determined from the environment for the rule generation 912. In an example, the rule generation 912 may be similar to the rule engine 820.

The rule generation 912 may be used for generation of the compatible product 906. In an example, the compatible product 906 may be a list of products, which may be associated with the personalization requirement mentioned above.

In operation, the compatibility check 902 may include compatibility rule generation based on the color, style, size attributes of AR data, the user requirement and a list of compatible products may be picked and embedded from multiple stores. In an example, the AR data may be sent via REST API either as XML or JSON format. In an example, the store data may be collected back by the system 110 and a map may be created. This is done on the real-time basis and compatibility is checked by the user selected attributes and virtual selected product attributes. The compatibility may not only at the real-world object but also along with the selected virtual product calculated while mapping. The compatibility check 902 may be performed in conjunction with the process 802, the affinity analysis 702, and the e-commerce data set 602 recommendation. For the recommendation of a product like the product 210, e-commerce data 602 may be used to identify similar products in that category and AR data or representative data 220 may be used to identify products across catalog and across various stores. In an example, the similar products identified may constitute the peripheral product parameter set 240. These recommendations may then be matched with product catalog and customer preference using the rules engine 914. In an example, the recommendations may then be matched with product catalog and customer preference using the second cognitive operation 245. As a result, a subset of products from the catalog may be selected through this process. In parallel, the users may be segmented into various groups through the customer segmentation 824 based on their buying pattern. For example, selected products are matched with the customer pattern through the rule engine 914 like luxury brands may be recommended to brand-conscious buyers to create the final set of recommendations 906. In an example, the compatible product 906 may include the peripheral augmented reality model 250.

Figure 10:
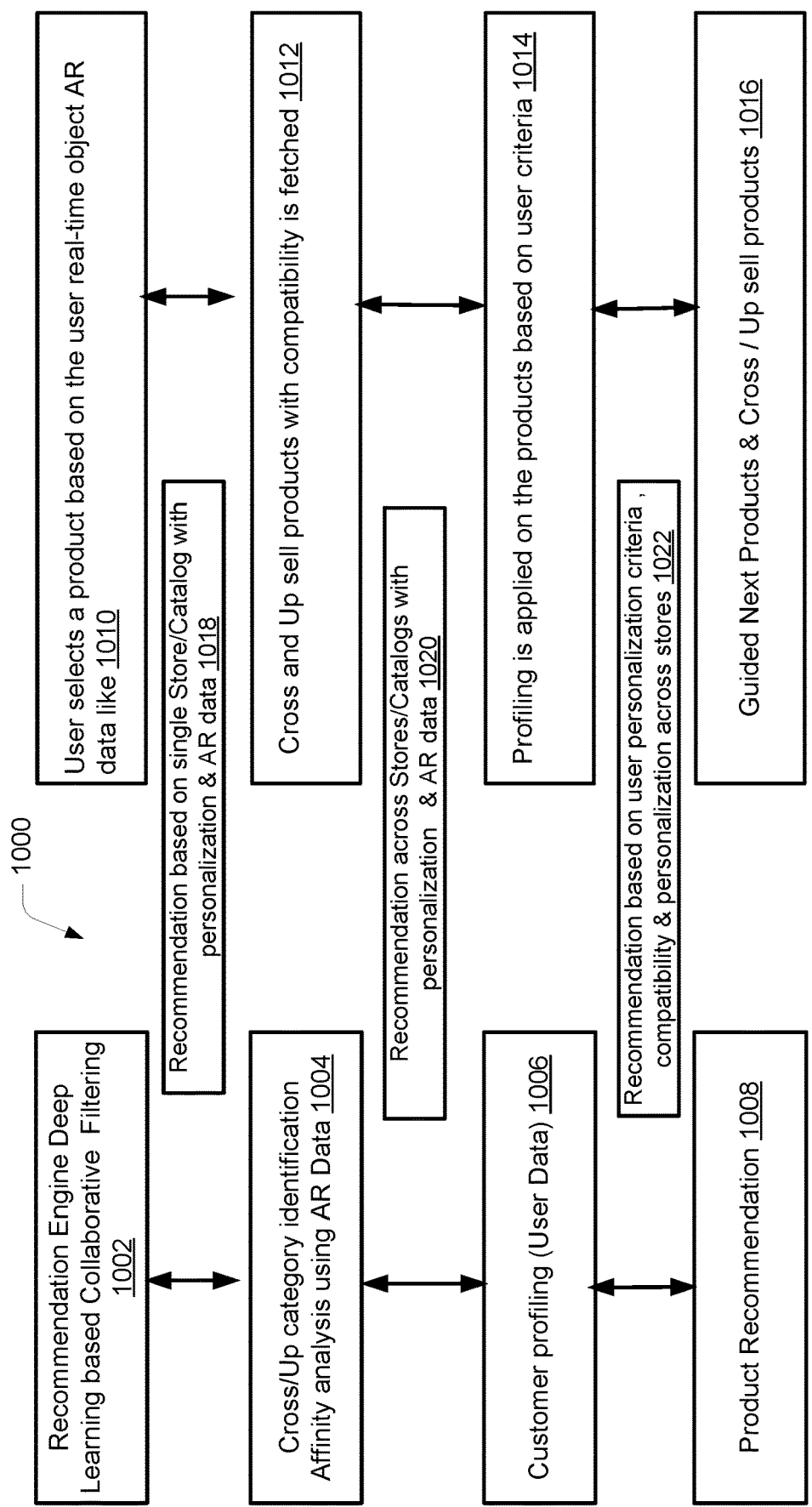
FIG. 10 illustrates a process flowchart for layered recommendation process deployed by the multisource augmented reality model, according to an example embodiment of the present disclosure.

FIG. 10 illustrates a process flowchart 1000 for a layered recommendation process (referred to as process 1000) deployed by the multisource augmented reality model, according to an example embodiment of the present disclosure. Any of the components of the system 110, the compatibility check 902, the process 802, the affinity analysis 702, and the e-commerce data set 602 recommendation may be used for purpose of the process 1000. The process 1000 may include a collaborative filtering 1002, an affinity analysis 1004, a customer profiling 1006, and a product recommendation 1008.

The collaborative filtering 1002 may include a selection 1010 and a recommendation 1018. The selection 1010 may include a user selecting a product based on the user real-time object AR data. The recommendation 1018 may be based on a single store/catalog data with personalization & AR data from the user. The selection 1010 and the recommendation 1018 have been explained in detail by way of FIG. 6. The recommendation 1018 may lead to the affinity analysis 1004. The affinity analysis 1004 may include a compatibility factor 1012, and a recommendation 1020. The compatibility factor 1012 may include fetching cross and up-sell products with a compatibility check. The recommendation 1018 may be based across various stores/catalogs with personalization & AR data from the user. The affinity analysis 1004 has been explained in detail by way of FIG. 7. The recommendation 1018 may lead to the customer profiling 1006. The customer profiling 1006 may include a profiling 1014, and a recommendation 1022. The profiling 1014 may include profiling product data based on user criterion. The recommendation 1022 may be based on user personalization criteria, compatibility & personalization across stores. The customer profiling 1006 has been explained in detail by way of FIG. 8. The recommendation 1022 may lead to the product recommendation 1008. The product recommendation 1008 may include a list 1016. The list 1016 may include a list of guided next products & cross/up-sell products. The product recommendation 1008 have been explained in detail by way of FIG. 9

Figure 11:
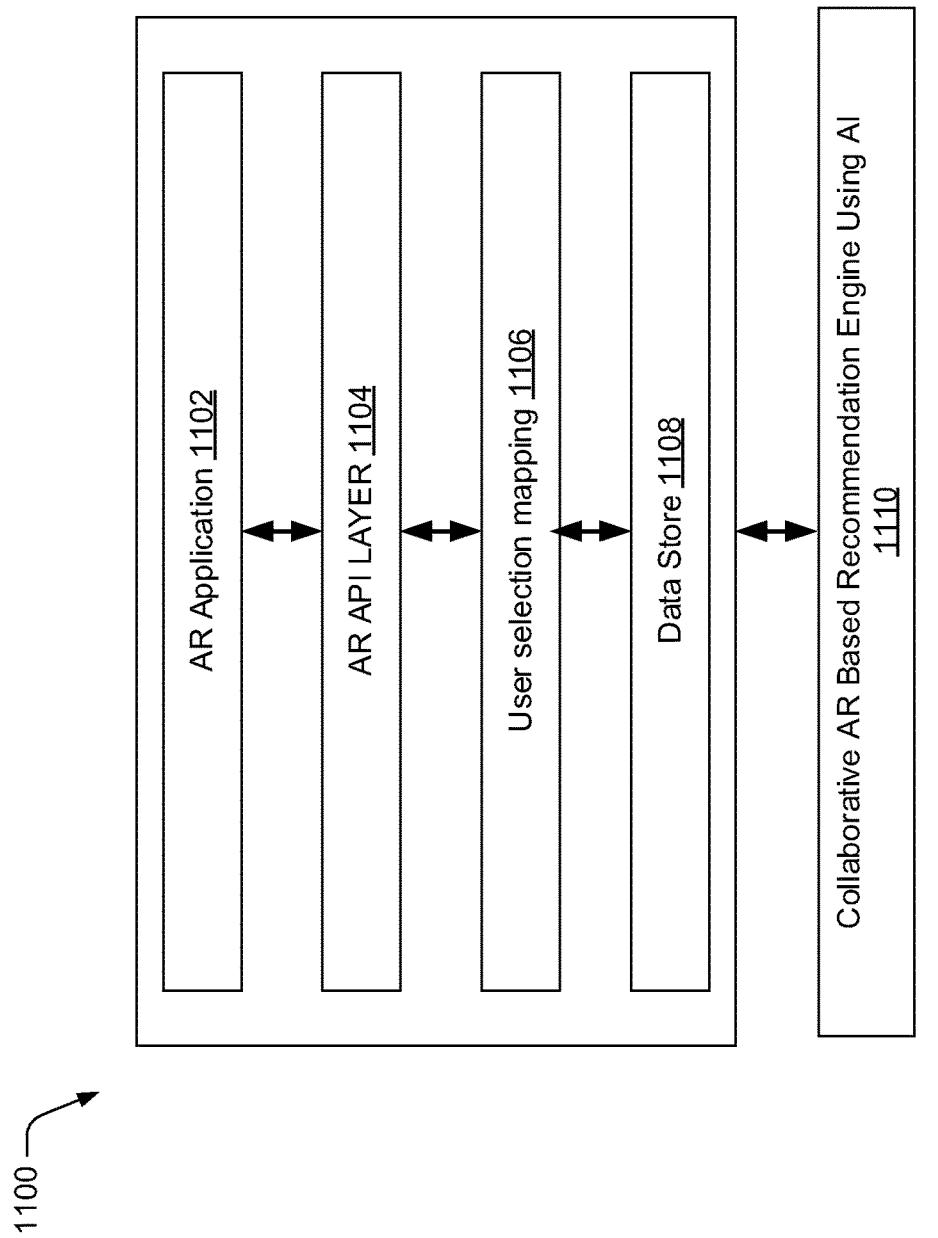
FIG. 11 illustrates a process flowchart for a viewpoint generation based on multisource augmented reality model, according to an example embodiment of the present disclosure.

FIG. 11 illustrates a process flowchart for a viewpoint generation 1100 based on multisource augmented reality model, according to an example embodiment of the present disclosure. Any of the components of the system 110 may be used for the purpose of the viewpoint generation 1100. As mentioned above, the system 110 may deploy the process 602, the affinity analysis 702, the customer profiling 802, and the compatibility check 902 for the generation of a list of compatible products for a customer for resolution of the query 205. In an example, the system 110 may be configured to perform the viewpoint generation 1100 after generation of a list of compatible products for a customer for resolution of the query 205. The viewpoint generation 1100 may be performed by sending the combination of the compatible products as the trigger event to the AR application onto the AR compatible medium. The viewpoint generation 1100 may facilitate a user in viewing multiple products augmented onto the AR compatible medium. The viewpoint generation 1100 may include an AR Application 1102. The AR application 1102 may be in communication with an AR API layer 1104. The AR API layer 1104 may refer to a set of functions and procedures allowing the creation of applications that access the features or data of an operating system, application, or another service for augmentation of the product 210 onto the AR compatible medium. The AR API layer 1104 may be in communication with a user selection mapping stage 1106. The user selection mapping stage 1106 has been explained in detail by way of FIG. 8. The user selection mapping stage 1106 may be in communication with a data store 1108. In an example, the data store 1108 may be the augmented reality data library. In an example, the data store 1108 may be the e-commerce data 602.

In an example, the AR application 1102 may be in communication with a recommendation engine 1110. In an example, a communication may be sent to the AR data store 1108 based on the selection of the product for the next event trigger and to create a view port. Each version on the selection may be maintained in the data store 1108. Therefore, if a user revisits the respected version of the product, the information may be obtained for the respective version and depicted on the view port. In an example, the view point generation 1100 triggers may be a combination of user real-world objects and selected cumulative products. The user real-world objects may be present in the environment and may be obtained for analysis through the representative data 220. The selected cumulative products may be obtained through the process of 1000 explained by way of FIG. 10. Each user selection may be converted into a frame by the viewpoint generation 1100. In an example, a user may select multiple products, then the viewpoint generation 1100 may include generation of multiple frames accounting for various permutations and combinations for augmenting all products included in the user selection.

Figure 12:
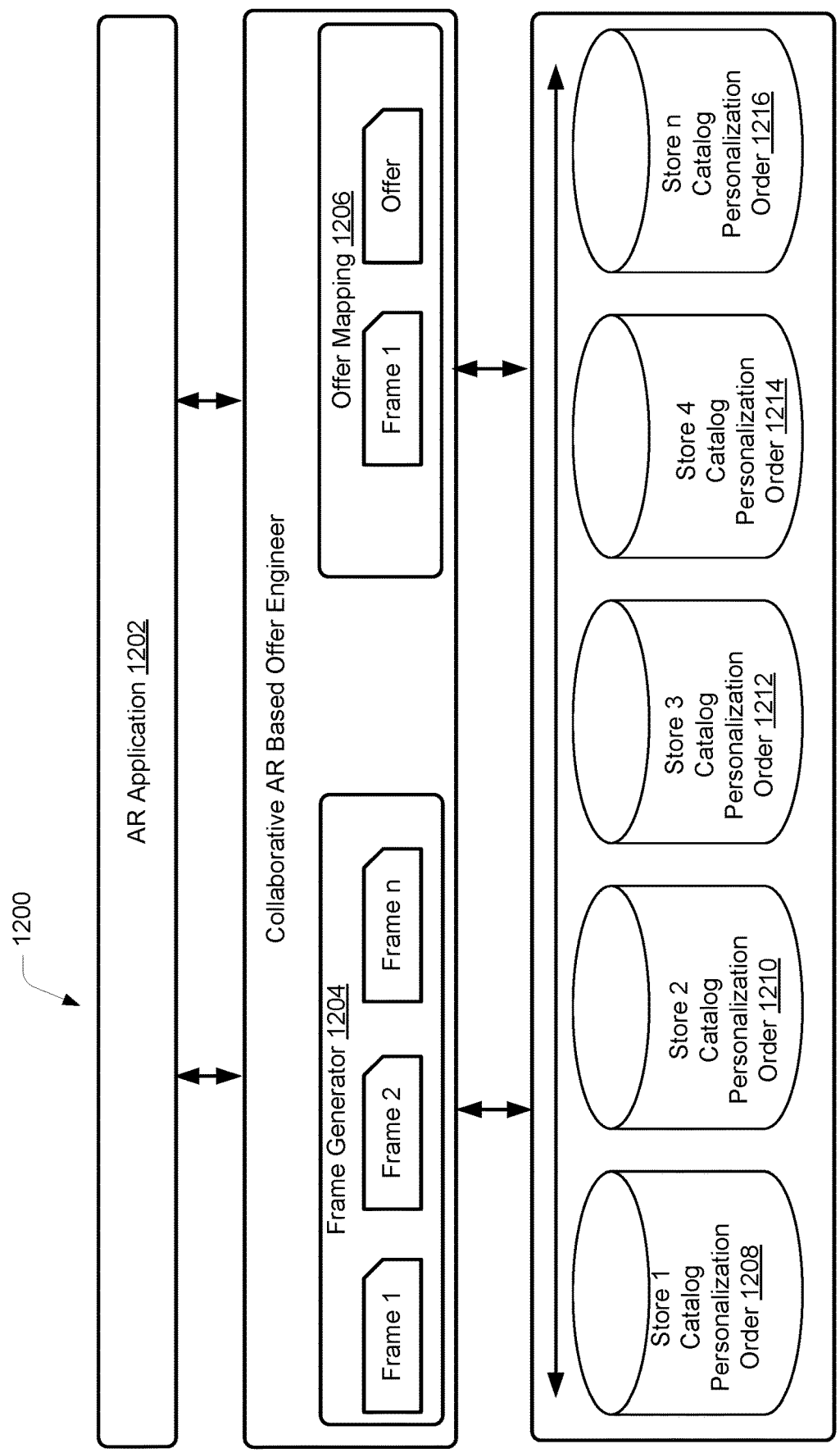
FIG. 12 illustrates a process flowchart for generating sales packages and various offers for a user based on the multisource augmented reality model, according to an example embodiment of the present disclosure.

FIG. 12 illustrates a process flowchart for generating a sales package 1200 and various offers for a user based on the multisource augmented reality model, according to an example embodiment of the present disclosure. Any of the components of the system 110 may be used for the purpose of the sales package 1200. The sales package 1200 may include an AR application 1202, an offer engine 1218, and personalization store data across various stores or e-commerce platforms. The sales package 1200 may include, for example, a store 1 catalog 1208, a store 2 catalog 1210, a store 3 catalog 1212, a store 4 catalog 1214, and a store n catalog 1216. Each of the store 1 catalog 1208, the store 2 catalog 1210, the store 3 catalog 1212, the store 4 catalog 1214, and the store n catalog 1216 may include information about various products and sales offers for various products. In an example, each of the store 1 catalog 1208, the store 2 catalog 1210, the store 3 catalog 1212, the store 4 catalog 1214, and the store n catalog 1216 may be in communication with the offer engine 1218.

The AR application 1202 may be similar to the AR application 1102 or the AR application 302. The AR application may be a user interface for interaction with the system 110. The AR application 1202 may be the AR compatible medium for augmenting various products for the user. The offer engine 1218 may further include a frame generator 1204 and an offer mapping component 1206. The frame generator 1204 may include generation of various frames for a user once the user selects a recommended product and moves to the next product. Each user selection may be converted into a frame by the viewpoint generation 1100. In an example, an API REST POST call may be triggered with the Frame details, Product details, location attribute details when a user may select a recommended product and moves to the next product. The API REST POST may refer to the POST method that may be used to request that the origin server accept the entity enclosed in the request as a new subordinate of the resource identified by the Request-URI in the Request-Line. It essentially means that POST request-URI should be of a collection URI. When a user may unselect a product from the AR application 1202 then the user selection mapping logic goes back to the data store 1208 to fetch the last frame details to generate the next view point using the frame generator 1204. The frame generator 1204 may store multiple frames relevant for the user selection. The offer mapping 1206 may obtain a frame from the multiple frames stored in the frame generator 1204 and combine the same with various offers across various stores, which may be stored in the offer engine 1218 through data from each of the store 1 catalog 1208, the store 2 catalog 1210, the store 3 catalog 1212, the store 4 catalog 1214, and the store n catalog 1216. The offer mapping 1206 may augment the best match between the user selected frame and offer mapped onto the AR application 1202.

Figure 13:
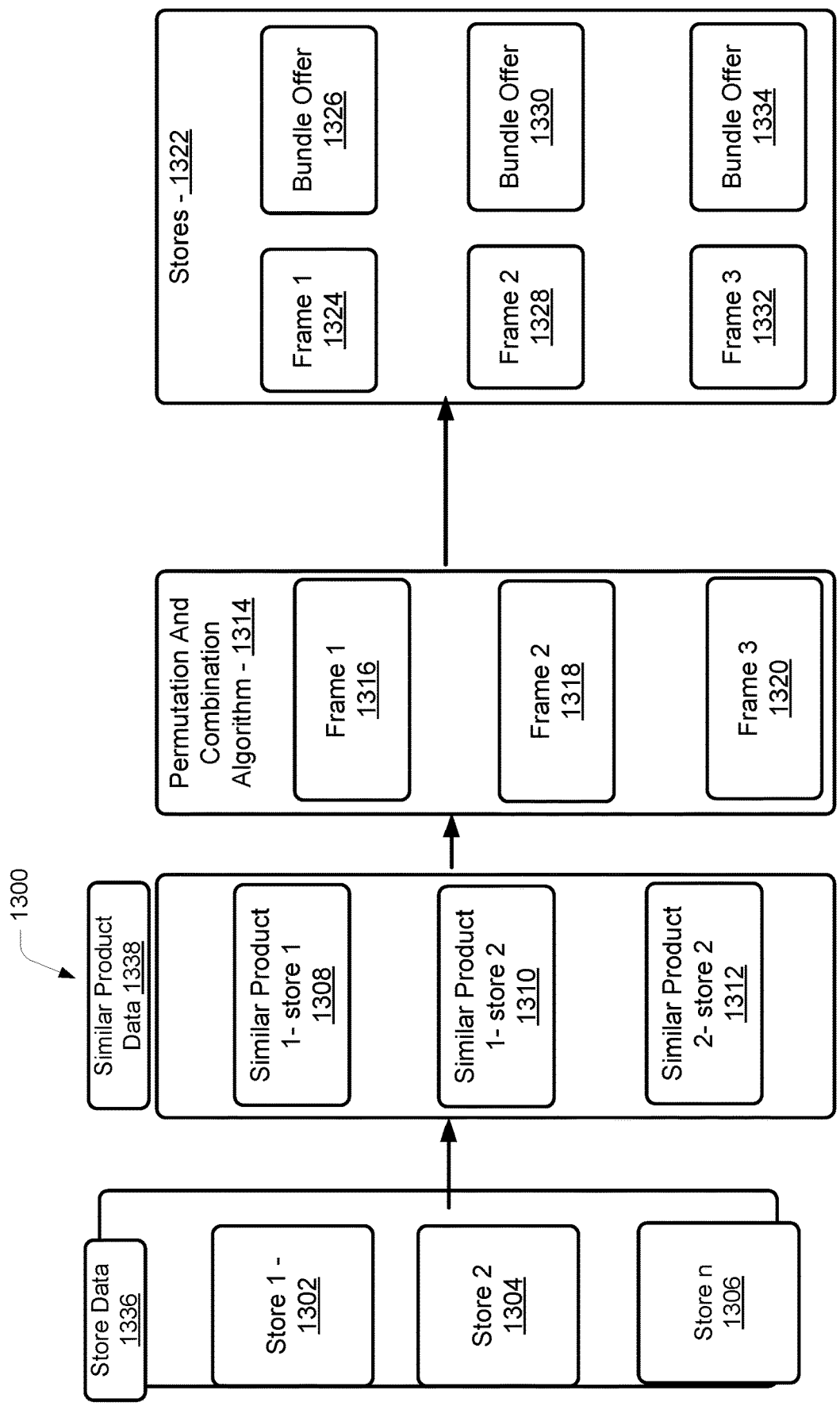
FIG. 13 illustrates a process flowchart for mapping various offers and sales packages based on the multisource augmented reality model, according to an example embodiment of the present disclosure.

FIG. 13 illustrates a flowchart for a process 1300 for mapping various offers and sales packages based on the multisource augmented reality model, according to an example embodiment of the present disclosure. Any of the components of the system 110 may be used for the purpose of the process 1300. In an example, the process 1300 may elaborate upon the offer generation across multiple stores by the offer engine 1218 as described by way of FIG. 12.

The process 1300 may include a store data 1336, similar products data 1338, a permutation and combination algorithm 1314, and a stores platform 1322. In an example, the store's data 1336 may be similar to data from each of the store 1 catalog 1208, the store 2 catalog 1210, the store 3 catalog 1212, the store 4 catalog 1214, and the store n catalog 1216. In an example, the store's data 1336 may include a store 1 data 1302, a store 2 data 1304, and a store n data 1306. The store's data 1336 may be in lead to the identification of the similar products data 1338. In an example, the similar products data 1338 may include a similar product 1 from store 1 data 1308, a similar product 1 from store 2 data 1310, and a similar product 2 from store 2 data 1312. The similar products data 1338 may be used by the permutation and combination algorithm 1314. The permutation and combination algorithm 1314 may generate various frames for each of the similar product 1 from store 1 data 1308, the similar product 1 from store 2 data 1310, and the similar product 2 from store 2 data 1312. In an example, the permutation and combination algorithm 1314 may generate a frame 1316 for the similar product 1 from store 1 data 1308. The permutation and combination algorithm 1314 may generate a frame 1318 for the similar product 1 from store 2 data 1310. The permutation and combination algorithm 1314 may generate a frame 1318 for the similar product 2 from store 2 data 1312. In an example, the product details may be sent to different store through REST API's and those stores may fetch similar products and send back the details for the same to the offer engine 1218. The offer engine 1218 may use the AR application 1202 API's to generate frames with similar products in the same viewpoints. The frame product details may be sent to the store's platform 1322 for generating a bundle offer for influencing the shopping decision of a user. In an example, the store's platform 1322 may include a frame 1 data 1324 mapped with a bundle offer 1326. The store's platform 1322 may include a frame 2 data 1328 mapped with a bundle offer 1330. The store's platform 1322 may include a frame 3 data 1332 mapped with a bundle offer 1334. In an example, the frame 1 data 1324, the frame 2 data 1328, and the frame 3 data 1332 may be the same as the frame 1316, the frame 1318, and the frame 1320 respectively. The offer mapping may be explained in detail by way of FIG. 14.

Figure 14:
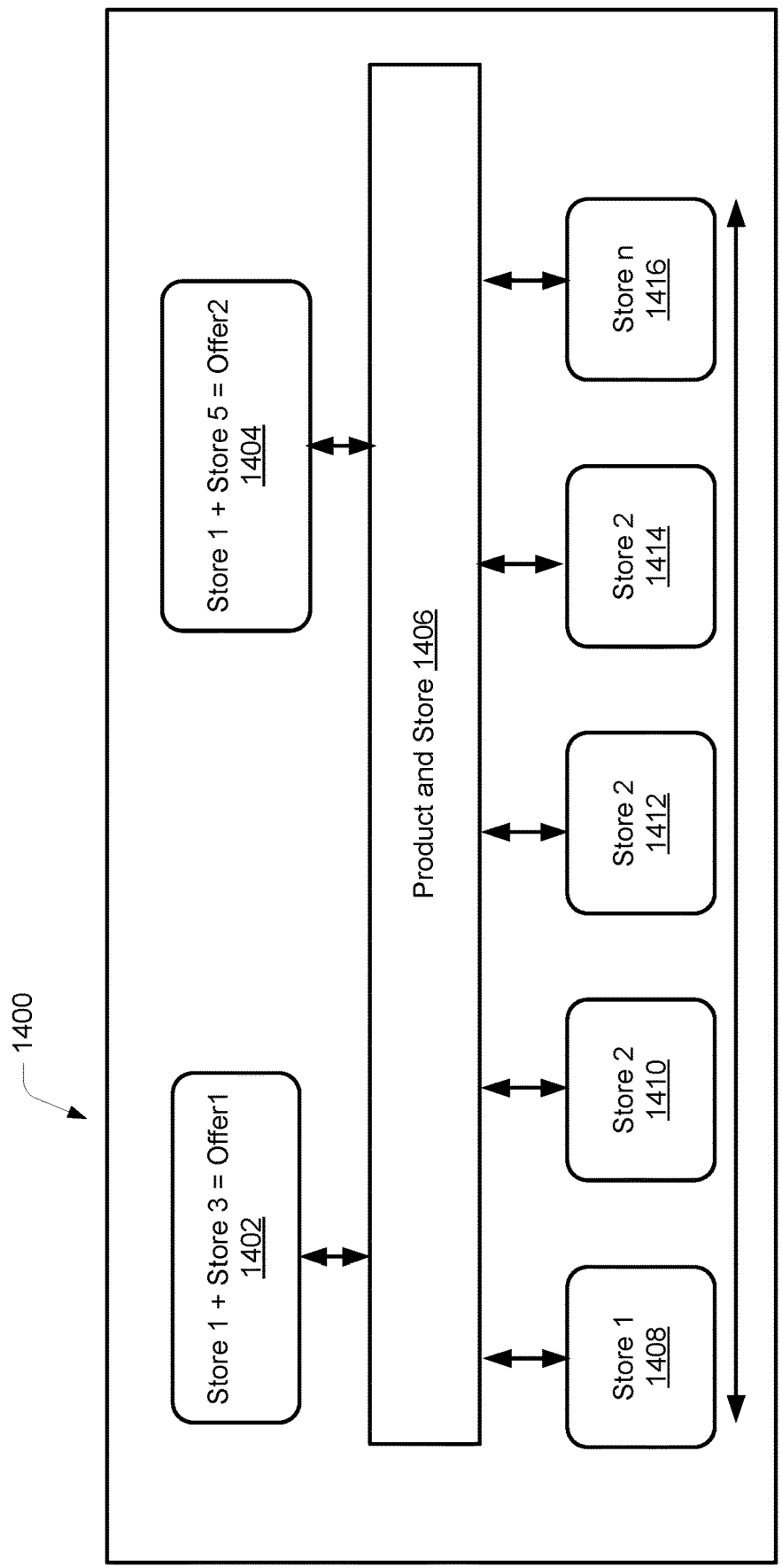
FIG. 14 illustrates a process flowchart for mapping various offers and across multiple e-commerce platforms based on multisource augmented reality model, according to an example embodiment of the present disclosure.

FIG. 14 illustrates a flowchart for a process 1400 for mapping various offers and across multiple e-commerce platforms based on multisource augmented reality model, according to an example embodiment of the present disclosure. Any of the components of the system 110 may be used for the purpose of the process 1400. In an example, the process 1400 may elaborate upon the process 1300 and 1200 for offer generation and mapping. As mentioned above, the each of the store 1 catalog 1208, the store 2 catalog 1210, the store 3 catalog 1212, the store 4 catalog 1214, and the store n catalog 1216 may be in communication with the offer engine 1218. In an example, each of the store 1 catalog 1208, the store 2 catalog 1210, the store 3 catalog 1212, the store 4 catalog 1214, and the store n catalog 1216 may be in communication with each other for forming a product and store dataset 1406. The product and store dataset 1406 may include data from various stores regarding various products and various stores. The product and store dataset 1406 may obtain data from a store 1 dataset 1408, a store 2 dataset 1410, a store 3 dataset 1412, a store 4 dataset 1414, and a store n dataset 1416. In an example, the stores may be event triggered with the POST REST API call on the combination of products from a different store. For example, the store 1 dataset 1408 may be combined with the store 3 dataset 1412 for generating an offer 1 data 1402. Additionally, the store 2 dataset 1410 may be combined with store 4 dataset 1414 for generating an offer 2 data 1404. Similarly, various stores datasets may be combined with each other for creating offer bundles in order to influence shopping decision for a user. In an example, a store may make a real-time call to other stores to set the offers and offer engine 1218 may combine the offers and show the same to the user.

Figure 15:
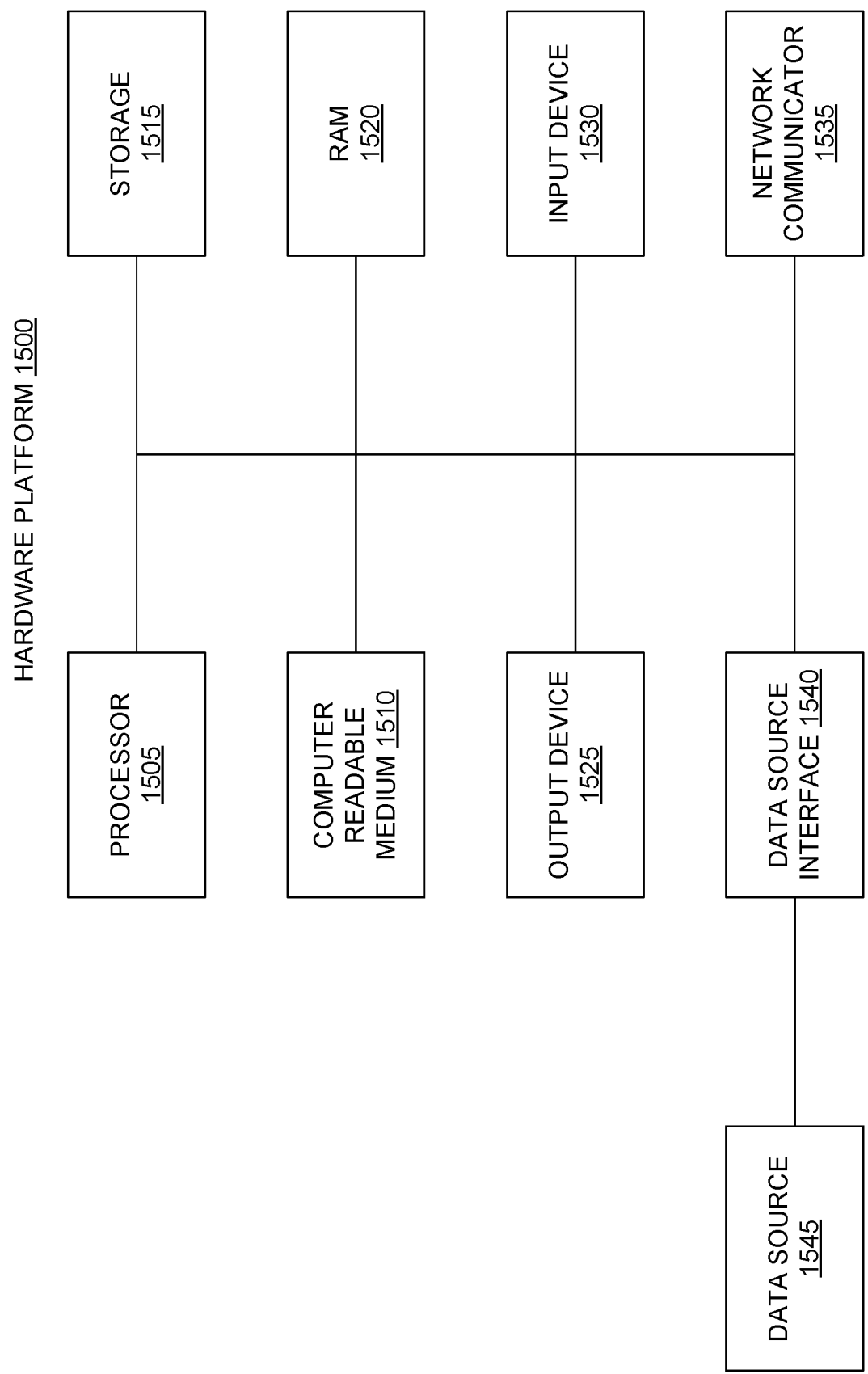
FIG. 15 illustrates a hardware platform for the implementation of the system, according to an example embodiment of the present disclosure.

FIG. 15 illustrates a hardware platform 1500 for implementation of the system 110, according to an example embodiment of the present disclosure. Particularly, computing machines such as but not limited to internal/external server clusters, quantum computers, desktops, laptops, smartphones, tablets and wearables which may be used to execute the system 110 or may have the structure of the hardware platform 1500. The hardware platform 1500 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 15, the hardware platform 1500 may be a computer system 1500 that may be used with the examples described herein. The computer system 1500 may represent a computational platform that includes components that may be in a server or another computer system. The computer system 1500 may execute, by a processor (e.g., a single or multiple processors) or other hardware processing circuit, the methods, functions and other processes described herein. These methods, functions and other processes may be embodied as machine-readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 1500 may include a processor 1505 that executes software instructions or code stored on a non-transitory computer-readable storage medium 1510 to perform methods of the present disclosure. The software code includes, for example, instructions to gather data and documents and analyze documents. In an example, the augmented reality data generator 130, the updater 140 and the modeler 150 may be software codes or components performing these steps.

The instructions on the computer-readable storage medium 1510 are read and stored the instructions in storage 1515 or in random access memory (RAM) 1520. The storage 1515 provides a large space for keeping static data where at least some instructions could be stored for later execution. The stored instructions may be further compiled to generate other representations of the instructions and dynamically stored in the RAM 1520. The processor 1505 reads instructions from the RAM 1520 and performs actions as instructed.

The computer system 1500 further includes an output device 1525 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 1500 further includes input device 1530 to provide a user or another device with mechanisms for entering data and/or otherwise interact with the computer system 1500. The input device may include, for example, a keyboard, a keypad, a mouse, or a touchscreen. In an example, the output of the updater 140 150 is displayed on the output device 1525. Each of these output devices 1525 and input devices 1530 could be joined by one or more additional peripherals. In an example, the output device 1525 may be used to display the results of the forecasting result 270.

A network communicator 1535 may be provided to connect the computer system 1500 to a network and in turn to other devices connected to the network including other clients, servers, data stores, and interfaces, for instance. A network communicator 1535 may include, for example, a network adapter such as a LAN adapter or a wireless adapter. The computer system 1500 includes a data source interface 1540 to access data source 1545. A data source is an information resource. As an example, a database of exceptions and rules may be a data source. Moreover, knowledge repositories and curated data may be other examples of data sources. In an example, the plurality of data domains 230 240 may be the data source 1545.

Figure 16A:
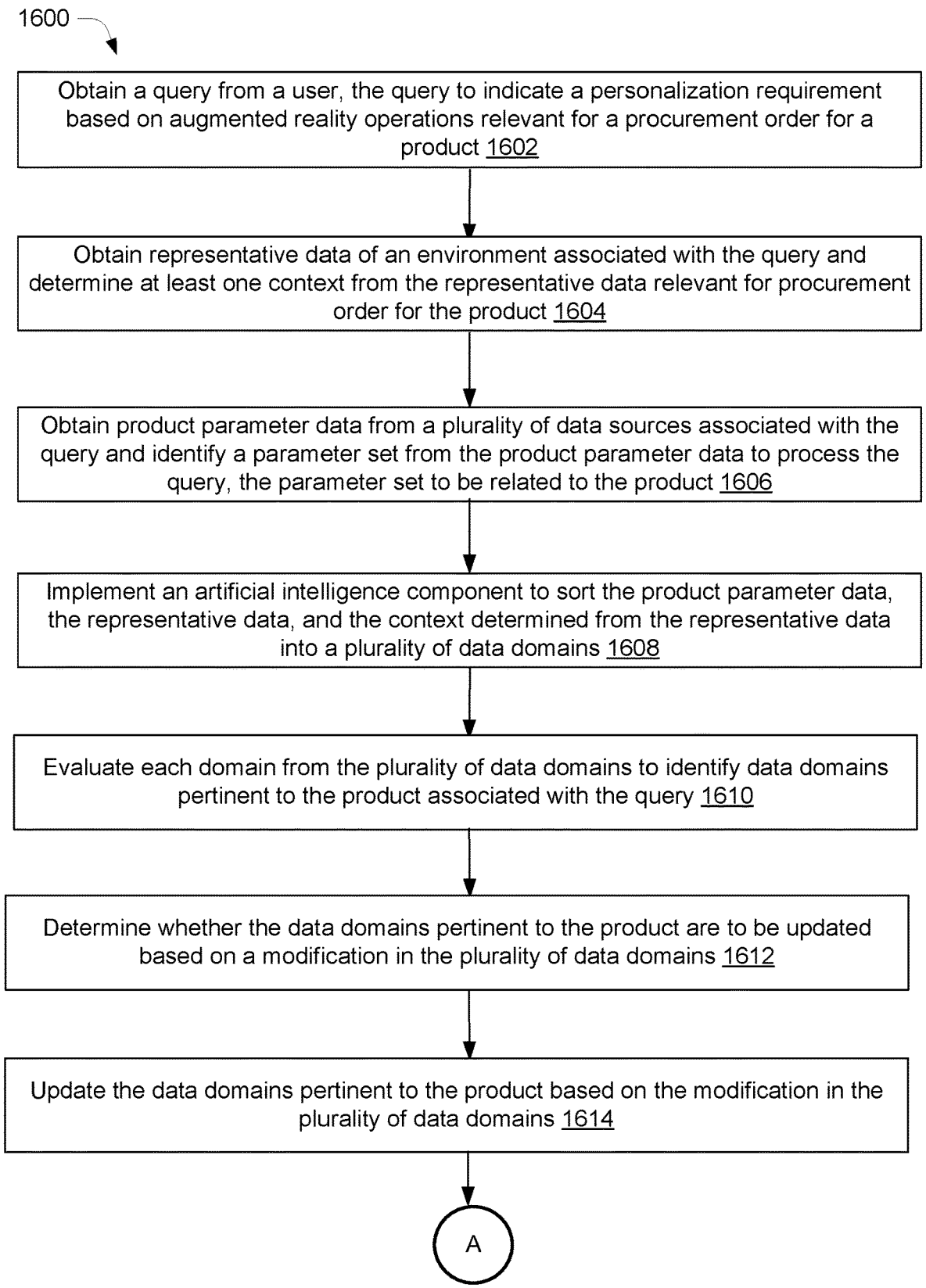
FIGS. 16A and 16B illustrate a process flowchart multisource augmented reality model, according to an example embodiment of the present disclosure.
Figure 16B:
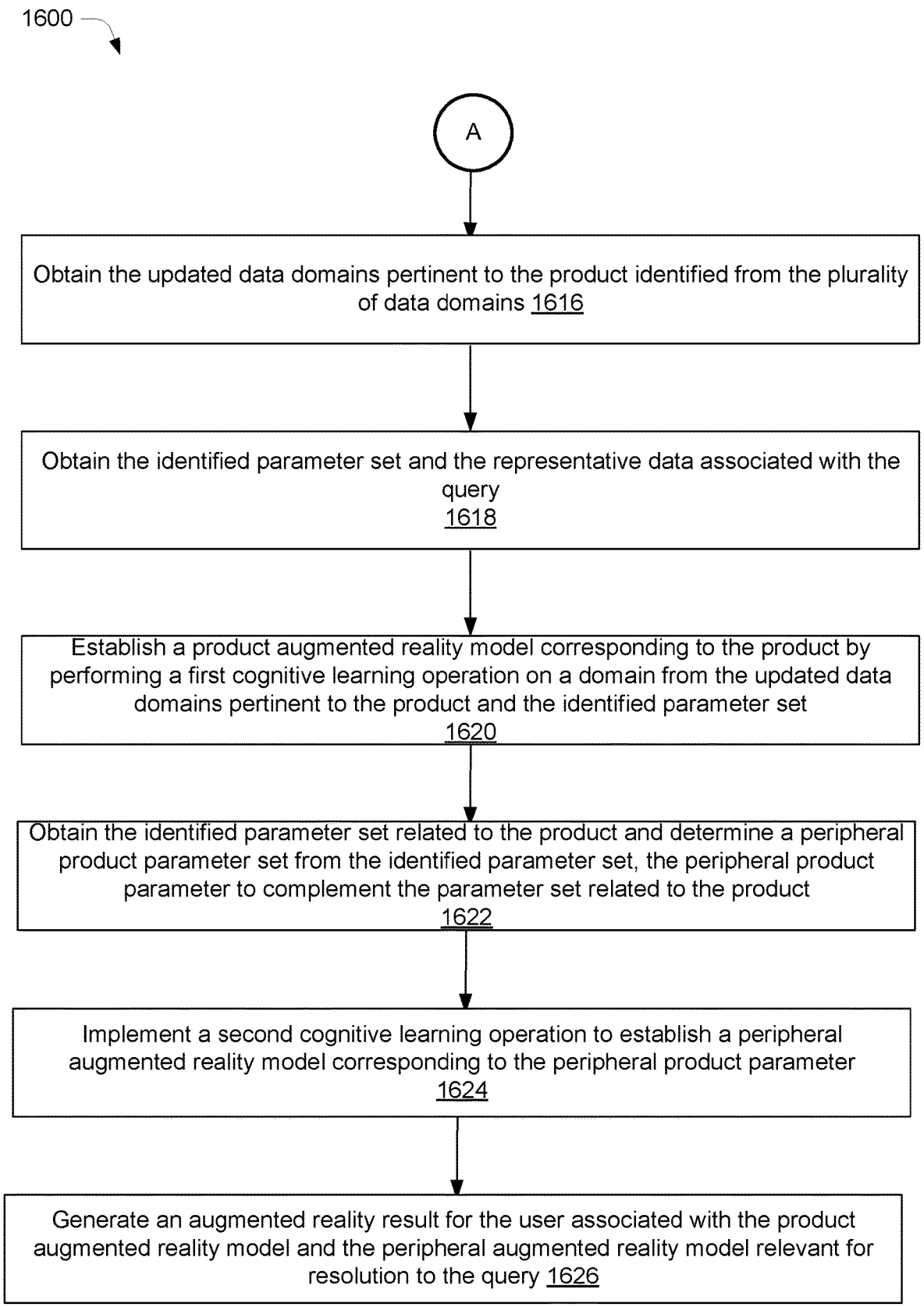

FIGS. 16A and 16B illustrate a method 1600 for the multisource augmented reality model system 110 according to an example embodiment of the present disclosure.

It should be understood that method steps are shown here for reference only and other combination of the steps may be possible. Further, the method 1600 may contain some steps in addition to the steps shown in FIG. 9. For the sake of brevity, construction and operational features of the system 110 which are explained in detail in the description of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14 are not explained in detail in the description of FIGS. 16A and 16B. The method 1600 may be performed by a component of the system 110, such as the processor 120, the augmented reality data generator 130, the updater 140, the monitor 160 and the modeler 150.

At block 1602, the query 205 may be obtained from a user, the query 205 to indicate a personalization requirement based on augmented reality operations relevant for a procurement order for a product 210.

At block 1604, at least one context may be determined from representative data 220 relevant for the procurement order for the product 210, the representative data 220 to correspond to an environment associated with the query 205.

At block 1606, product parameter data may be obtained from a plurality of data sources associated with the query 205 and identify a parameter set 215 from the product parameter data to process the query 205, the parameter set 215 to be related to the product 210.

At block 1608, an artificial intelligence component 225 may be implemented to sort the product parameter data, the representative data 220, and the context determined from the representative data 220 into a plurality of data domains 230.

At block 1610, each domain from the plurality of data domains 230 may be evaluated to identify pertinent data domains 235 associated with the query 205.

At block 1612, the method 1600 may include determining whether the pertinent data domains 235 are to be updated based on a modification in the plurality of data domains 230.

At block 1614, the pertinent data domains 235 based on the modification in the plurality of data domains 230 may be updated.

At block 1616, the updated pertinent data domains 235 identified from the plurality of data domains 230 may be obtained.

At block 1618, the identified parameter set 215 and the representative data 220 associated with the query 205 may be obtained.

At block 1620, a product augmented reality model 260 may be established corresponding to the product 210 by performing a first cognitive learning operation on a domain from the updated pertinent data domains 235 and the identified parameter set 215.

At block 1622, the identified parameter set 215 may be obtained related to the product 210 and determine a peripheral product parameter set 240 from the identified parameter set 215, the peripheral product parameter to complement the parameter set 215 related to the product 210.

At block 1624, a second cognitive learning operation may be implemented to establish a peripheral augmented reality model corresponding to the peripheral product 210 parameters.

At block 1626, an augmented reality result may be generated for the user associated with the product augmented reality model 260 and the peripheral augmented reality model relevant for a resolution to the query 205.

In an example, the method 1600 may be practiced using a non-transitory computer-readable medium. In an example, the method 1600 may be a computer-implemented method.

The present disclosure provides for a real intelligence augmentation model which will consider the right set of criteria, and perform a compatibility analysis amongst various items across multiple e-commerce stores. Additionally, reactive synthesis of procurement intelligence, which may also be considering the impact of multiple factors and compatibility analysis based on the request of a user may be required by current retail paradigm. Further, the model may be facilitating multiple store collaborations, sales package generation, and the like based continuous sensing of emerging risks and opportunities, the evaluation of recommendations, and the rapid action/engagement opportunities of completing a sales process. The system may also be used for guided procurement of product 210s. For example, the system may propose a product 210 for a user based on user selection of a previous product 210.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
   a processor;
   a non-transitory storage medium coupled to the processor to store instructions, which when executed by the processor, cause the processor to:
   obtain a query from a user, the query indicating a personalization requirement based on augmented reality operations relevant for a procurement order for a product;
   determine at least one context from representative data relevant for the procurement order for the product, the representative data to correspond to an environment associated with the query;
   obtain product parameter data from a plurality of data sources associated with the query and identify a parameter set from the product parameter data to process the query, the parameter set to be related to the product;
   implement an artificial intelligence component to sort the product parameter data, the representative data, and the context determined from the representative data into a plurality of data domains;
   evaluate each domain from the plurality of data domains to identify data domains pertinent to the product associated with the query;
   determine whether the data domains pertinent to the product are to be updated based on a modification in the plurality of data domains;
   update the data domains pertinent to the product based on the modification in the plurality of data domains;
   obtain the updated data domains pertinent to the product identified from the plurality of data domains;
   obtain the identified parameter set and the representative data associated with the query;
   establish a product augmented reality model corresponding to the product by performing a first cognitive learning operation on a domain from the updated data domains pertinent to the product and the identified parameter set;
   determine a peripheral product parameter set that complements the parameter set related to the product;
   implement a second cognitive learning operation to establish a peripheral augmented reality model corresponding to the peripheral product parameter set; and
   generate an augmented reality result for the user associated with the product augmented reality model and the peripheral augmented reality model relevant for resolution to the query.

2. The system as claimed in claim 1, wherein the augmented reality result is generated as an interactive augmented reality interface in response to the query of the user.

3. The system as claimed in claim 1, wherein the processor is to further electronically notify the user when there is a change in the data domains pertinent to the product due to the modification in the plurality of data domains.

4. The system as claimed in claim 1, wherein the processor is to further provide evidence supporting the peripheral augmented reality model.

5. The system as claimed in claim 1, wherein the processor is to further establish an augmented reality data library, by associating the data domains pertinent to the product with the product augmented reality model and the peripheral augmented reality model.

6. The system as claimed in claim 5, wherein the system is to further analyze the augmented reality data library for validation of the product augmented reality model and the peripheral augmented reality model.

7. The system as claimed in claim 1, wherein the processor is to further update the peripheral product parameter set and the associated peripheral augmented reality model based on a modification in the product augmented reality model.

8. A method comprising:
   obtaining, by a processor, a query from a user, the query to indicate a personalization requirement based on augmented reality operations relevant for a procurement order for a product;
   determining, by the processor, at least one context from representative data relevant for the procurement order for the product, the representative data to correspond to an environment associated with the query;
   obtaining, by the processor, product parameter data from a plurality of data sources associated with the query and identifying a parameter set from the product parameter data to process the query, the parameter set to be related to the product;
   implementing, by the processor, an artificial intelligence component to sort the product parameter data, the representative data, and the context determined from the representative data into a plurality of data domains;
   evaluating, by the processor, each domain from the plurality of data domains to identify data domains pertinent to the product associated with the query;
   determining, by the processor, whether the data domains pertinent to the product are to be updated based on a modification in the plurality of data domains;
   updating, by the processor, the data domains pertinent to the product based on the modification in the plurality of data domains;
   obtaining, by the processor, the updated data domains pertinent to the product identified from the plurality of data domains;
   obtaining, by the processor, the identified parameter set and the representative data associated with the query;
   establishing, by the processor, a product augmented reality model corresponding to the product by performing a first cognitive learning operation on a domain from the updated data domains pertinent to the product and the identified parameter set;
   determining a peripheral product parameter set that complements the parameter set related to the product;
   implementing, by the processor, a second cognitive learning operation to establish a peripheral augmented reality model corresponding to the peripheral product parameter; and
   generating, by the processor, an augmented reality result for the user associated with the product augmented reality model and the peripheral augmented reality model relevant for resolution to the query.

9. The method as claimed in claim 8, wherein the method further comprises generating, by the processor, the augmented reality result as an interactive augmented reality interface in response to the query of the user.

10. The method as claimed in claim 8, wherein the method further comprises electronically notifying, by the processor, the user when there is a change in the data domains pertinent to the product due to the modification in the plurality of data domains.

11. The method as claimed in claim 8, wherein the method further comprises providing, by the processor an evidence supporting the peripheral augmented reality model.

12. The method as claimed in claim 8, wherein the method further comprises establishing, by the processor, an augmented reality data library, by associating the data domains pertinent to the product with the product augmented reality model and the peripheral augmented reality model.

13. The method as claimed in claim 12, wherein the method further comprises analyzing, by the processor, the augmented reality data library for validation of the product augmented reality model and the peripheral augmented reality model.

14. The method as claimed in claim 8, wherein the method further comprises updating, by the processor, the peripheral product parameter set and the associated peripheral augmented reality model based on a modification in the product augmented reality model.

15. A non-transitory computer readable medium including machine readable instructions that are executable by a processor to:
   obtain a query from a user, the query to indicate a personalization requirement based on augmented reality operations relevant for a procurement order for a product;
   determine at least one context from representative data relevant for the procurement order for the product, the representative data to correspond to an environment associated with the query;
   obtain product parameter data from a plurality of data sources associated with the query and identify a parameter set from the product parameter data to process the query, the parameter set to be related to the product;
   implement an artificial intelligence component to sort the product parameter data, the representative data, and the context determined from the representative data into a plurality of data domains;
   evaluate each domain from the plurality of data domains to identify data domains pertinent to the product associated with the query;
   determine whether the data domains pertinent to the product are to be updated based on a modification in the plurality of data domains;
   update the data domains pertinent to the product based on the modification in the plurality of data domains;
   obtain the updated data domains pertinent to the product identified from the plurality of data domains;
   obtain the identified parameter set and the representative data associated with the query;
   establish a product augmented reality model corresponding to the product by performing a first cognitive learning operation on a domain from the updated data domains pertinent to the product and the identified parameter set;
   determine a peripheral product parameter set that complements the parameter set related to the product;
   implement a second cognitive learning operation to establish a peripheral augmented reality model corresponding to the peripheral product parameter; and
   generate an augmented reality result for the user associated with the product augmented reality model and the peripheral augmented reality model relevant for resolution to the query.

16. The non-transitory computer-readable medium of claim 15, wherein the processor is to generate the augmented reality result as an interactive augmented reality interface in response to the query of the user.

17. The non-transitory computer-readable medium of claim 15, wherein the processor is to electronically notify the user when there is a change in the data domains pertinent to the product due to the modification in the plurality of data domains.

18. The non-transitory computer-readable medium of claim 15, wherein the processor is to provide evidence supporting the peripheral augmented reality model.

19. The non-transitory computer-readable medium of claim 15, wherein the processor is to establish an augmented reality data library, by associating the data domains pertinent to the product with the product augmented reality model and the peripheral augmented reality model.

20. The non-transitory computer-readable medium of claim 15, wherein the processor is to update the peripheral product parameter set and the associated peripheral augmented reality model based on a modification in the product augmented reality model.

\* \* \* \* \*